(12) United States Patent
Pizzocchero et al.

(10) Patent No.: US 12,499,548 B2
(45) Date of Patent: Dec. 16, 2025

(54) METHODS AND SYSTEMS FOR AUTHENTICATION OF A PHYSICAL DOCUMENT

(71) Applicant: Onfido Ltd., London (GB)

(72) Inventors: Daniele Pizzocchero, London (GB); Jimmy Moore, London (GB); Zhiyuan Shi, London (GB); Christos Sagonas, London (GB); Mohan Mahadevan, London (GB); Yuanwei Li, London (GB)

(73) Assignee: Onfido Ltd., London (GB)

( * ) Notice: Subject to any disclaimer, the term of this patent is extended or adjusted under 35 U.S.C. 154(b) by 861 days.

(21) Appl. No.: 17/688,572

(22) Filed: Mar. 7, 2022

(65) Prior Publication Data

US 2023/0281820 A1    Sep. 7, 2023

(51) Int. Cl.
*G06T 7/11* (2017.01)

(52) U.S. Cl.
CPC ............ *G06T 7/11* (2017.01); *G06F 2218/12* (2023.01); *G06T 2207/10004* (2013.01);
(Continued)

(58) Field of Classification Search
CPC ............ G06T 7/11; G06T 2207/10004; G06T 2207/10016; G06T 2207/20081;
(Continued)

(56) References Cited

U.S. PATENT DOCUMENTS 7,590,344 B2    9/2009 Petschnigg
7,672,475 B2    3/2010 O'Doherty et al.
(Continued)

FOREIGN PATENT DOCUMENTS

CN    112434727 A    3/2021
DE    102018102015 A1    8/2019
(Continued)

OTHER PUBLICATIONS

Y. Yoon et al., "Online Multiple Pedestrians Tracking using Deep Temporal Appearance Matching Association," arXiv:1907.00831v4 [cs.CV] Oct. 9, 2020, available at https://arxiv.org/pdf/1907.00831. pdf, 28 pages.
(Continued)

*Primary Examiner* — Pinalben Patel
(74) *Attorney, Agent, or Firm* — Merchant & Gould P.C.

(57) ABSTRACT

Described herein are computerized methods and systems for authentication of a physical document. An image capture device coupled to a mobile device captures a sequence of images of a physical document as at least one of the physical document or the image capture device is rotated, during which the mobile device tracks the physical document throughout the sequence of images, and adjusts operational parameters of the image capture device based upon imaging conditions associated with the physical document. The mobile device selects images from the sequence of images and classifies the physical document using the selected images. The mobile device identifies a region of interest in the physical document using the selected images and the classification. The mobile device reconstructs the region of interest, generates an authentication score for the document using the reconstructed region of interest, and determines whether the physical document is authentic based upon the authentication score.

59 Claims, 19 Drawing Sheets

(52) U.S. Cl.
CPC ............... *G06T 2207/10016* (2013.01); *G06T 2207/20081* (2013.01); *G06T 2207/20084* (2013.01); *G06T 2207/30176* (2013.01)

(58) Field of Classification Search
CPC . G06T 2207/20084; G06T 2207/30176; G06F 2218/12
See application file for complete search history.

(56) References Cited

U.S. PATENT DOCUMENTS

| | | | |
|---|---|---|---|
| 7,925,096 | B2 | 4/2011 | Baxter et al. |
| 8,025,239 | B2 | 9/2011 | Labrec et al. |
| 8,156,115 | B1 | 4/2012 | Erol et al. |
| 8,627,939 | B1 | 1/2014 | Jones et al. |
| 8,786,767 | B2 | 7/2014 | Rihn et al. |
| 9,058,535 | B2 | 6/2015 | Guigan |
| 9,081,988 | B2 | 7/2015 | Dolev |
| 9,153,005 | B2 | 10/2015 | Tremolada et al. |
| 9,418,282 | B2 | 8/2016 | Rutz et al. |
| 9,619,701 | B2 * | 4/2017 | Ragnet ................ G06F 3/04845 |
| 9,652,690 | B2 * | 5/2017 | Eid ........................... G06T 7/13 |
| 9,779,296 | B1 | 10/2017 | Ma et al. |
| 10,019,626 | B2 | 7/2018 | Schilling et al. |
| 10,019,627 | B2 | 7/2018 | Kutter et al. |
| 10,127,454 | B2 | 11/2018 | Pau et al. |
| 10,140,511 | B2 | 11/2018 | Macciola et al. |
| 10,331,291 | B1 | 6/2019 | Poder et al. |
| 10,354,142 | B2 | 7/2019 | Arlazarov et al. |
| 10,402,448 | B2 | 9/2019 | Filgueiras de Araujo et al. |
| 10,477,087 | B2 | 11/2019 | Rivard et al. |
| 10,621,426 | B2 | 4/2020 | Gaubatz et al. |
| 10,726,256 | B2 | 7/2020 | Wu et al. |
| 10,789,463 | B2 | 9/2020 | Kutter et al. |
| 10,872,488 | B2 | 12/2020 | Azanza Ladron et al. |
| 11,144,752 | B1 * | 10/2021 | Castelblanco Cruz ..................... G06T 7/194 |
| 11,159,763 | B2 * | 10/2021 | Donsbach ......... G06F 18/24143 |
| 11,235,613 | B2 | 2/2022 | Bud et al. |
| 11,527,087 | B1 | 12/2022 | Geusz et al. |
| 11,546,519 | B2 | 1/2023 | Bhatia et al. |
| 11,607,901 | B2 | 3/2023 | Cape et al. |
| 12,026,932 | B2 | 7/2024 | Cheong et al. |
| 12,056,978 | B2 | 8/2024 | Avitan et al. |
| 2007/0041628 | A1 | 2/2007 | Fan |
| 2008/0158258 | A1 | 7/2008 | Lazarus et al. |
| 2008/0231418 | A1 | 9/2008 | Ophey et al. |
| 2012/0226600 | A1 | 9/2012 | Dolev |
| 2013/0185618 | A1 | 7/2013 | Macciola et al. |
| 2013/0262333 | A1 | 10/2013 | Wicker et al. |
| 2014/0032406 | A1 | 1/2014 | Roach et al. |
| 2014/0037196 | A1 | 2/2014 | Blair |
| 2014/0055824 | A1 | 2/2014 | Tremolada et al. |
| 2014/0105449 | A1 | 4/2014 | Caton et al. |
| 2014/0355069 | A1 | 12/2014 | Caton et al. |
| 2015/0093018 | A1 | 4/2015 | Macciola et al. |
| 2015/0302421 | A1 | 10/2015 | Caton et al. |
| 2015/0324390 | A1 | 11/2015 | Macciola et al. |
| 2016/0307035 | A1 | 10/2016 | Schilling et al. |
| 2016/0350592 | A1 | 12/2016 | Ma et al. |
| 2017/0132465 | A1 | 5/2017 | Kutter et al. |
| 2017/0132866 | A1 | 5/2017 | Kuklinkski et al. |
| 2017/0200247 | A1 | 7/2017 | Kuklinski et al. |
| 2019/0087942 | A1 * | 3/2019 | Ma ........................... H04N 1/00 |
| 2019/0164010 | A1 | 5/2019 | Ma et al. |
| 2019/0213408 | A1 | 7/2019 | Cali et al. |
| 2019/0220660 | A1 | 7/2019 | Cali et al. |
| 2019/0372968 | A1 | 12/2019 | Balogh et al. |
| 2019/0392196 | A1 | 12/2019 | Sagonas et al. |
| 2020/0051059 | A1 | 2/2020 | Filler |
| 2020/0210796 | A1 | 7/2020 | Hsu et al. |
| 2020/0387700 | A1 | 12/2020 | Wu |
| 2020/0394763 | A1 | 12/2020 | Ma et al. |
| 2021/0117520 | A1 | 4/2021 | Ross |
| 2021/0158036 | A1 | 5/2021 | Huber, Jr. |
| 2021/0160687 | A1 | 5/2021 | Ross et al. |
| 2021/0200855 | A1 | 7/2021 | Guigan |
| 2022/0051423 | A1 * | 2/2022 | Du Preez ................ G06T 7/514 |
| 2022/0343483 | A1 | 10/2022 | Desai |

FOREIGN PATENT DOCUMENTS

| | | |
|---|---|---|
| EP | 3526781 | 4/2018 |
| FR | 2977349 A3 | 1/2013 |
| WO | 2021044082 A1 | 3/2021 |

OTHER PUBLICATIONS

S. Mallick, "Object Tracking using OpenCV (C++ / Python)," Feb. 13, 2017, available at https://learnopencv.com/object-tracking-using-opencv-cpp-python/, 12 pages.

K. He et al., "Deep Residual Learning for Image Recognition," arXiv:1512.03385v1 [cs.CV] Dec. 10, 2015, available at https://arxiv.org/pdf/1512.03385v1.pdf, 12 pages.

C. Szegedy et al., "Rethinking the Inception Architecture for Computer Vision," arXiv:1500567v3 [cs.CV] Dec. 11, 2015, available at https://arxiv.org/pdf/1512.00567v3.pdf, 10 pages.

M. Tan & Q.V. Lee, "EfficientNet: Rethinking Model Scaling for Convolutional Neural Networks," arXiv:1905.11946v5 [cs.LG] Sep. 11, 2020, available at https://arxiv.org/pdf/1905.11946.pdf, 11 pages.

C. Wang et al., "EfficientNet-eLite: Extremely Lightweight and Efficient CNN Models for Edge Devices by Network Candidate Search," arXiv:2009.07409v1 [cs.CV] Sep. 16, 2020, available at https://arxiv.org/pdf/2009.07409v1.pdf, 10 pages.

P. Simon and U. V., "Deep Learning based Feature Extraction for Texture Classification," Third International Conference on Computing and Network Communications (CoCoNet'19), Procedia Computer Science 171 (2020), pp. 1680-1687 (2020).

T. Zhang et al., "Spatial-Temporal Recurrent Neural Network for Emotion Recognition," arXiv:1705.0451v1 [cs.CV] May 12, 2017, available at https://arxiv.org/pdf/1705.04515.pdf, 8 pages.

Y. Dong et al., "A Hybrid Spatial-temporal Deep Learning Architecture for Lane Detection," arXiv:2110.04079 [cs.CV] Oct. 14, 2021, available at https://arxiv.org/ftp/arxiv/papers/2110/2110.04079.pdf, 18 pages.

G. Balakrishnan et al., "VoxelMorph: A Learning Framework for Deformable Medical Image Registration," arXiv:1809.05231v3 [cs.CV] Sep. 1, 2019, available at https://arxiv.org/pdf/1809.05231.pdf, 16 pages.

I. Rocco et al., "Convolutional neural network architecture for geometric matching," arXiv:1703.05593v2 [cs.CV] Apr. 13, 2017, available at https://arxiv.org/pdf/1703.05593.pdf, 15 pages.

M. Jadenberg et al., "Spatial Transformer Networks," arXiv:1506.02025v3 [cs.CV] Feb. 4, 2016, available at https://arxiv.org/pdf/1506.02025.pdf, 15 pages.

P. H. Seo et al., "Attentive Semantic Alignment with Offset-Aware Correlation Kernels," arXiv:1808.02128v2 [cs.CV] Oct. 26, 2018, available at https://arxiv.org/pdf/1808.02128.pdf, 21 pages.

R. Chen et al., "Video Foreground Detection Algorithm Based on Fast Principal Component Pursuit and Motion Saliency," Comput. Intell. Neurosci. 2019, doi: 10.1155/2019/4769185, published Feb. 3, 2019, available at https://www.ncbi.nlm.nih.gov/pmc/articles/PMC6378080/, 11 pages.

E. Candes et al., "Robust Principal Component Analysis?", arXiv:0912.3599v1 [cs.IT] Dec. 18, 2009, available at https://arxiv.org/pdf/0912.3599.pdf, 39 pages.

E. Rosten and T. Drummond, "Machine learning for high-speed corner detection," Computer Vision—ECCV 2006, Lecture Notes in Computer Science, vol. 3951, pp. 430-443, doi:10.1007/11744023_34, 14 pages.

E. Mair et al., "Adaptive and generic corner detection based on the accelerated segment test," Computer Vision—ECCV 2010, Lecture Notes in Computer Science, vol. 6312, pp. 183-196, doi:10.1007/978-3-642-15552-9_14, 14 pages.

K. Mikolajczyk and C. Schmid, "Scale & Affine Invariant Interest Point Detectors," International Journal of Computer Vision 60(1), pp. 63-86, 2004, 24 pages.

(56) References Cited

OTHER PUBLICATIONS

M. Agarwal et al., "CenSurE: Center surround extremas for real time feature detection and matching," Computer Vision—ECCV 2008, Lecture Notes in Computer Science, vol. 5305, pp. 102-115, doi: 10.1007/978-3-540-88693-8_8, 14 pages.
D.G. Lowe, "Distinctive Image Features from Scale-Invariant Keypoints," International Journal of Computer Vision 60, pp. 99-110 (2004), doi: 10.1023/B:VISI.0000029664.99615.94, 28 pages.
E. Rublee et al., "ORB: an efficient alternative to Sift or Surf," 2011 International Conference on Computer Vision, doi:10.1109/ICCV. 2011.6126544, 8 pages.
S. Leutenegger et al., "BRISK: Binary Robust Invariant Scalable Keypoints," 2011 International Conference on Computer Vision, pp. 2548-2555, doi:10.1109/ICCV.2011.6126542, 8 pages.
P.F. Alcantarilla et al., "Fast explicit diffusion for accelerated features in nonlinear scale spaces," British Machine Vision Conf. (BMVC) 2013, doi: 10.5244/C.27.13, 11 pages.
P.F. Alcantarilla et al., "KAZE Features," Computer Vision—ECCV 2012, Lecture Notes in Computer Science, vol. 7577, pp. 214-227, 14 pages.
A. Alahi et al., "Freak: Fast retina keypoint," Proceedings of the 2012 IEEE Conference on Computer Vision and Pattern Recognition (CVPR), pp. 510-517.
M. Calonder et al., "Brief: Computing a local binary descriptor very fast," IEEE Transactions on Pattern Analysis and Machine Intelligence, vol. 34, No. 7, pp. 1281-1298 (2011), 29 pages.
E. Tola et al., "Daisy: An Efficient Dense Descriptor Applied to Wide Baseline Stereo," IEEE Transactions on Pattern Matching and Machine Intelligence, 2010, vol. 32, No. 5, pp. 815-830, doi: 10.1109/TPAMI.2009.77, 17 pages.
G. Levi and T. Hassner, "LATCH: Learned Arrangements of Three Patch Codes," 2016 IEEE Winter Conference on Applications of Computer Vision (WACV), Lake Placid, NY, Mar. 7-10, 2016, available at https://talhassner.github.io/home/projects/LATCH/LATCH.pdf, 9 pages.
K. Simonyan and A. Zisserman, "Very deep convolutional networks for large-scale image recognition," arXiv:1409.1556v6 [cs.CV], Apr. 10, 2015, available at https://arxiv.org/pdf/1409.1556v6.pdf, 14 pages.
B. Lakshminarayanan et al., "Simple and Scalable Predictive Uncertainty Estimation using Deep Ensembles," arXiv:1612.01474v3 [stat.ML] Nov. 4, 2017, available at https://arxiv.org/pdf/1612.01474v3.pdf, 15 pages.
R. Rahaman and A.H. Thiery, "Uncertainty Quantification and Deep Ensembles," arXiv:2007.08792v4 [stat.ML] Nov. 2, 2021, available at https://arxiv.org/pdf/2007.08792.pdf, 16 pages.
R. Selvaraju et al., "Grad-CAM: Visual Explanations from Deep Networks via Gradient-based Localization," arXiv:1610.02391 [cs.CV] Dec. 3, 2019, available at https://arxiv.org/pdf/1610.02391.pdf, 23 pages.
G. Montavon et al., "Layer-Wise Relevance Propagation: An Overview," Explainable AI: Interpreting, Explaining and Visualizing Deep Learning, Lecture Notes in Computer Science, vol. 11700, pp. 193-209, Sep. 10, 2019, Springer.
M. Sundararajan et al., "Axiomatic Attribution for Deep Networks," arXiv:1703.01365v2 [cs.LG] Jun. 13, 2017, available at https://arxiv.org/pdf/1703.01365.pdf, 11 pages.
P. Kindermans et al., "Learning How to Explain Neural Networks: PatternNet and PatternAttribution," arXiv:1705.05598v2 [stat.ML] Oct. 24, 2017, available at https://arxiv.org/pdf/1705.05598.pdf, 12 pages.
W. Lim et al., "The adoption of deep learning interpretability techniques on diabetic retinopathy analysis: a review," Medical & Biological Engineering & Computing 60, pp. 633-642 (2022).
K. Simonyan et al., "Deep Inside Convolutional Networks: Visualising Image Classification Models and Saliency Maps," arXiv:1312.6034v2 [cs.CV] Apr. 19, 2014, available at https://arxiv.org/pdf/1312.6034.pdf, 8 pages.
M.D. Zeiler and R. Fergus, "Visualizing and Understanding Convolutional Networks," European Conference on Computer Vision (ECCV 2014), Lecture Notes in Computer Science, vol. 8689 (2014), Springer, pp. 818-833.
B. Gao and M.W. Spratling, "Robust Template Matching via Hierarchical Convolutional Features from a Shape Based CNN," arXiv:2007.15817v3 [cs.CV] May 7, 2021, available at https://arxiv.org/pdf/2007.15817.pdf, 11 pages.
C. Kim et al., "End-to-end deep learning-based autonomous driving control for high-speed environment," The Journal of Supercomputing 78, pp. 1961-1982 (2022), doi.org/10.1007/s11227-021-03929-8.
R. Polvara et al., "Toward End-to-End Control for UAV Autonomous Landing via Deep Reinforcement Learning," 2018 International Conference on Unmanned Aircraft Systems (ICUAS), Jun. 12-15, 2018, DOI: 10.1109/ICUAS.2018.8453449.
J. Shi and Tomasi, "Good features to track," 1994 Proceedings of IEEE Conference on Computer Vision and Pattern Recognition, pp. 593-600, doi: 10.1109/CVPR.1994.323794.
A. Hartl et al., "Efficient Verification of Holograms Using Mobile Augmented Reality," IEEE Transactions on Visualization and Computer Graphics, Nov. 2015, 10 pages.
J. Redmon et al., "You Only Look Once: Unified, Real-Time Object Detection," arXiv:1506.02640v5 [cs.CV] May 9, 2016, available at https://arxiv.org/pdf/1506.02640.pdf, 10 pages.
W. Liu et al., "SSD: Single Shot MultiBox Detector," arXiv:1512.02325v5 [cs.CV] Dec. 29, 2016, available at https://arxiv.org/pdf/1512.02325.pdf, 17 pages.
S. Ren et al., "Faster R-CNN: Toward Real-Time Object Detection with Region Proposal Networks," arXiv:1506.01497v1 [cs.CV] Jun. 4, 2015, available at https://arxiv.org/pdf/1506.01497v1.pdf, 10 pages.
A. G. Howard et al., "MobileNets: Efficient Convolutional Neural Networks for Mobile Vision Applications," arXiv:1704.0486v1 [cs.CV] Apr. 17, 2017, available at https://arxiv.org/pdf/1704.04861.pdf, 9 pages.
N. Wojke et al., "Simple Online and Realtime Tracking with a Deep Association Metric," arXiv:1703.07402v1 [cs.CV] Mar. 21, 2017, available at https://arxiv.org/pdf/1703.07402.pdf, 5 pages.
P. Bergmann et al., "Tracking without bells and whistles," arXiv:1903.05625v3 [cs.CV] Aug. 17, 2019, available at https://arxiv.org/pdf/1903.05625.pdf, 16 pages.
G. Ciaparrone et al., "Deep Learning in Video Multi-Object Tracking: A Survey," arXiv:1907.12740v4 [cs.CV] Nov. 19, 2019, available at https://arxiv.org/pdf/1907.12740.pdf, 42 pages.
E. Bochinski et al., "Extending IOU Based Multi-Object Tracking by Visual Information" (2018), available at https://elvera.nue.tu-berlin.de/files/1547Bochinski2018.pdf, 6 pages.
X. Zhou et al., "Tracking Objects as Points," arXiv:2004.01177v2 [cs.CV] Aug. 21, 2020, available at https://arxiv.org/pdf/2004.01177.pdf, 22 pages.
Hartl et al "AR-Based Hologram Detection on Security Documents Using a Mobile Phone" 18th International Conference, pp. 335-346, Sep. 24-27, 2015.
Soukup et al "Mobile Hologram Verification with Deep Learning" 15th IAPR International Conference on Machine Vision Applications, pp. 169-172, May 8, 2017.

\* cited by examiner

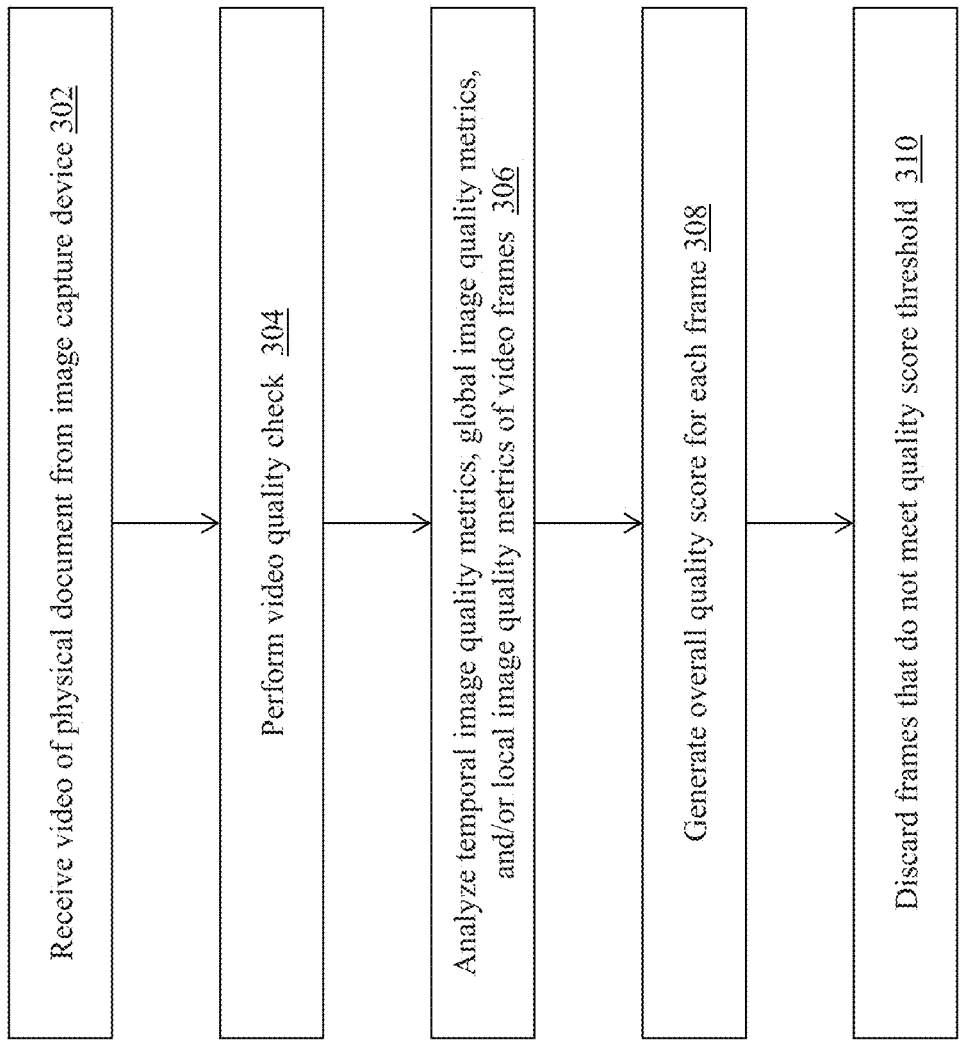

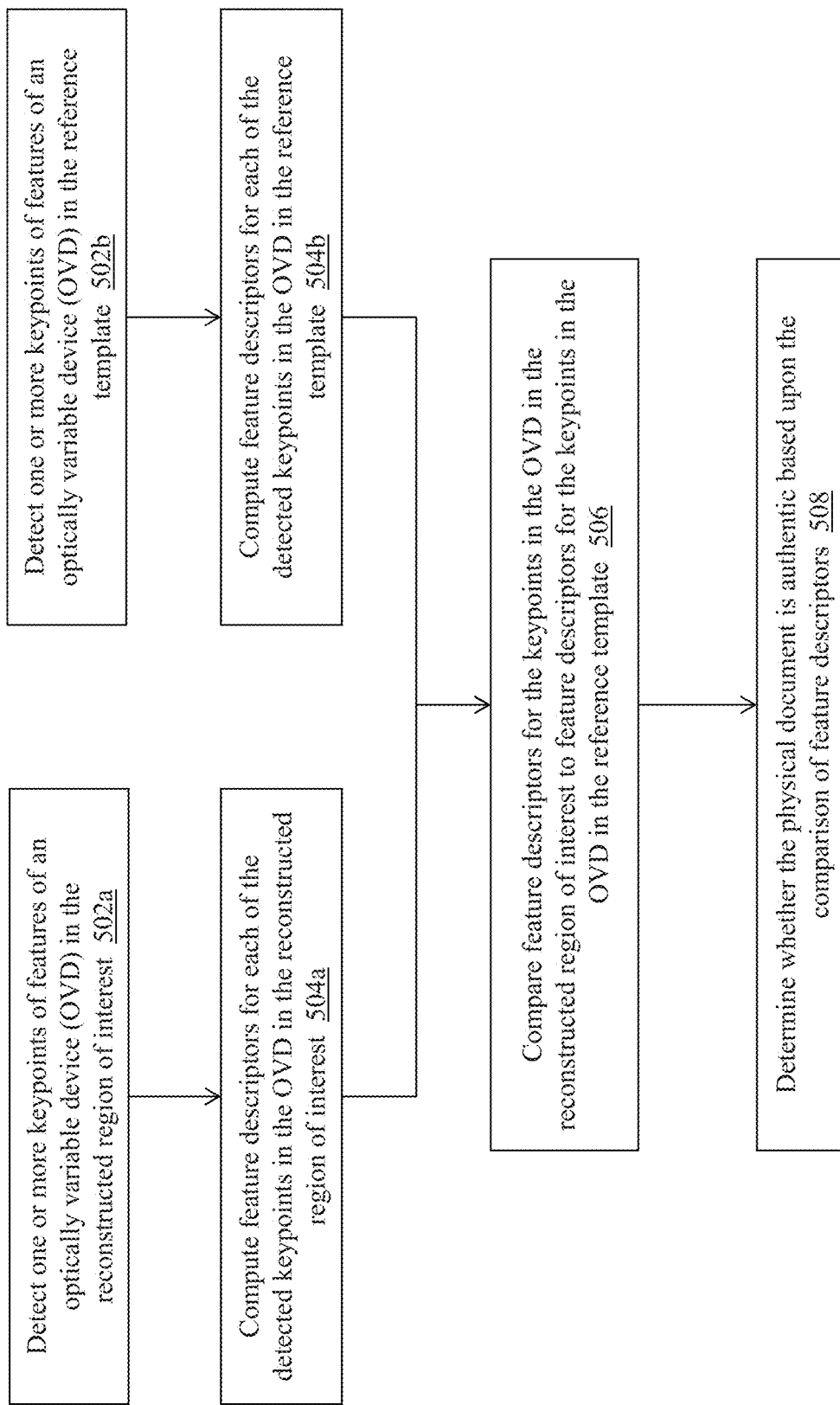

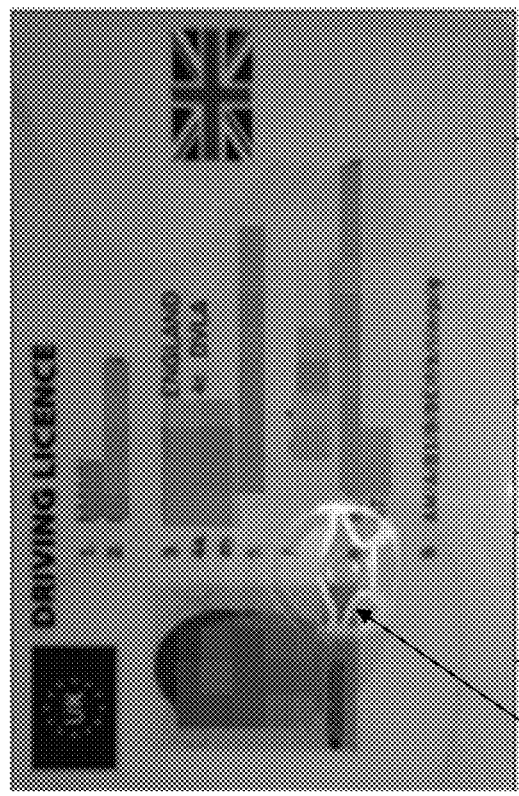
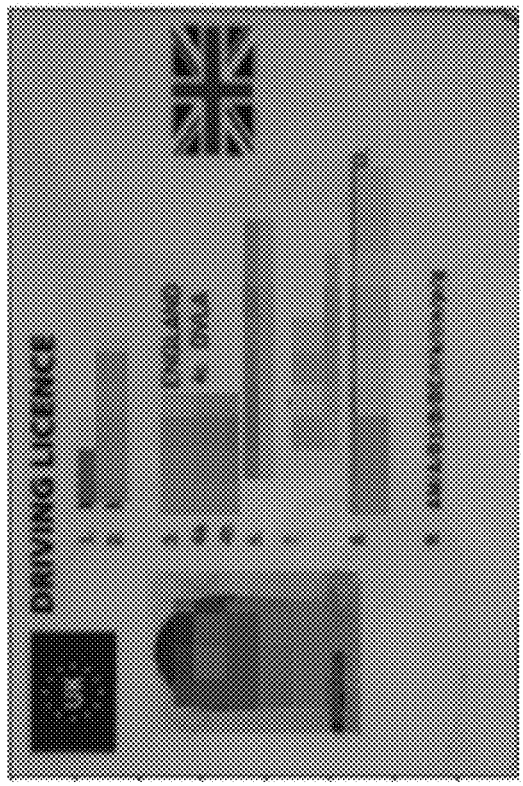
FIG. 10

FIG. 11

METHODS AND SYSTEMS FOR AUTHENTICATION OF A PHYSICAL DOCUMENT

TECHNICAL FIELD

The subject matter of the application relates generally to methods and systems for authentication of a physical document, including but not limited to analyzing one or more regions of interest on the physical document in order to authenticate the document.

BACKGROUND

Verification of a person's identity is most often conducted using official documents, such as government-issued identification cards, passports, and other similar documents. In one example, to pass through a security checkpoint, a person may present one or more official documents as proof of identity to an assessor (e.g., a security guard, agent, etc.). The assessor verifies that the official documents are valid and authentic, usually by performing one or more standard checks such as viewing the document from one or more angles, scanning the document using a reader device and/or at different lightning conditions (e.g., ultraviolet, infrared, visible light, varying light intensities and focus conditions) and so forth. In another example, official documents may be presented to an assessor either in-person or virtually for access to a product or service, or execution of a transaction. To aid the assessor in verifying the authenticity of a document, many official documents include security features, such as optically-variable devices (OVDs), barcodes, Quick Response (QR) codes, machine readable zones (MRZs), in a particular configuration, format, or structural arrangement to indicate that the document is authentic and also make it increasingly difficult to tamper with or copy the security feature. The assessor can quickly look for the presence of these security features and make a determination of whether the presented document is authentic or fraudulent. As can be appreciated, security features are difficult to reproduce faithfully for fraudulent actors and, in most cases (except for highly sophisticated actors), fake security features are often either missing, poorly reproduced, clearly fraudulent, or include erroneously reproduced characteristics or elements of the security feature on the original document.

However, due to advances in technology, document counterfeiting schemes have grown more robust in recent years. Many fake documents produced today may appear to be authentic to a human reviewer. Deepfake technology has advanced significantly, leveraging artificial intelligence techniques and advances in computing power to create synthetic images and videos of real people. In addition, digital on-boarding has increased substantially which requires verification of official documents over a network or otherwise without the actual physical document being presented to a human reviewer. Therefore, the need to accurately assess authenticity of documents is critical.

Existing approaches to automatically assess whether a document is authentic suffer from several significant drawbacks. Most approaches attempt to authenticate a document using a single 2D image capture of the document. These approaches have a very simple user experience (i.e., capture one photo of the document or capture multiple photos of the document and select a single 'good' image). However, when only a single image of a document is used, it is exceedingly rare that a specific region of interest (such as an OVD) is fully visible. Often, such regions may be only partially visible or not visible at all. As a result, 2D approaches cannot be optimized for maximum signal acquisition—and thus fraudulent actors can slip fake documents past such authenticity checks easier than if an OVD is entirely visible. Also, existing 2D methods have relied upon data-driven techniques in the 2D capture realm, which limits their ability to scale to new documents quickly, both in on-boarding of documents but also in the number of required samples for a training set.

Other existing approaches to solve this problem rely on 3D image capture, which introduces the complexity of handling real-world noise issues. 3D image capture use cases have to be able to operate across hundreds, if not thousands, of different mobile device platforms and configurations (i.e., hardware and software differences). Due to the wide spectrum of mobile device capabilities and the varying levels of image quality and noise that accompany those devices, automation of a reliable, accurate document verification process is very difficult.

SUMMARY

Therefore, what is needed is are methods and systems for automatically assessing the authenticity of documents using automated frameworks of passive image capture and active image capture workflows to acquire relevant data to assess the document, process videos of the document and quickly determine whether the document is, and/or populations of documents are, genuine or fraudulent based on techniques such as (i) comparison of the document(s) and/or certain regions of interest in the document(s) with a known verified document template and/or (ii) analysis of one or more features of the document(s) and/or certain regions of interest in the document(s) using customized pipelines of classical computer vision algorithms and machine learning models including deep learning models. The techniques described herein advantageously expand the maximum signal that can be captured by using three-dimensional rotations and varying imaging conditions or lighting conditions (in the case of Active Document Liveness) and varying image capture settings or lighting conditions without requiring the user to actively interact with the document during data acquisition (in the case of Passive Document Liveness) to elicit a sufficient response from one or more regions of interest such as optically variable devices (OVDs) integrated into the document, that can then be used to compare to a document template (and/or populations of documents, and/or through use of advanced machine learning techniques) and authenticate the document(s). As can be appreciated, the methods and systems presented herein beneficially improve upon existing document authentication routines by providing for accurate and robust amplification of OVD signals acquired during image capture, suppression of noise to increase image quality and accuracy of document reconstruction, and automated analysis and validation of document authenticity. Leveraging the advantageous methods and systems described herein, that utilize specific processing and post-processing pipeline innovations, the ADL and PDL techniques enable amplification of genuine OVD signal while also mitigating noise to create a highly-automated document authentication pipeline which allows for easy on boarding of new document to the system, while maintaining very high accuracy rates. The methods and systems described herein also allow for scaling efficiency in data required to scale the system to leverage technologies which utilize the available data most effectively to quickly onboard new documents and scale the solution as data increases over time.

The invention, in one aspect, features a system for authenticating a physical document. The system comprises a mobile computing device coupled to an image capture device. The mobile computing device captures, using the image capture device, a sequence of images of a physical document in a scene as at least one of the physical document or the image capture device is rotated, during which the mobile computing device tracks the physical document throughout the sequence of images, and adjusts one or more operational parameters of the image capture device based upon one or more imaging conditions associated with the physical document, as detected in one or more images of the sequence of images. The mobile computing device select one or more images from the sequence of images and classifies the physical document using the selected images. The mobile computing device identifies a region of interest in the physical document using the selected images and the classification of the physical document. The mobile computing device reconstructs the region of interest using the selected images. The mobile computing device generates an authentication score for the document using the reconstructed region of interest. The mobile computing device determines whether the physical document is authentic based upon the authentication score.

The invention, in another aspect, features a computerized method of authenticating a physical document. An image capture device coupled to a mobile computing device captures a sequence of images of a physical document in a scene as at least one of the physical document or the image capture device is rotated, during which the mobile computing device tracks the physical document throughout the sequence of images, and adjusts one or more operational parameters of the image capture device based upon one or more imaging conditions associated with the physical document, as detected in one or more images of the sequence of images. The mobile computing device select one or more images from the sequence of images and classifies the physical document using the selected images. The mobile computing device identifies a region of interest in the physical document using the selected images and the classification of the physical document. The mobile computing device reconstructs the region of interest using the selected images. The mobile computing device generates an authentication score for the document using the reconstructed region of interest. The mobile computing device determines whether the physical document is authentic based upon the authentication score.

Any of the above aspects can include one or more of the following features. In some embodiments, at least one of the physical document or the image capture device is rotated or tilted along one or more axes. In some embodiments, tracking the physical document throughout the sequence of images comprises dynamically determining a minimum range of motion for the physical document based upon one or more of the imaging conditions or the operational parameters of the image capture device, determining whether the rotation or tilt of the physical document or the image capture device satisfies the minimum range of motion, and instructing a user of the mobile computing device to continue rotating or tilting the physical document or the image capture device until the minimum range of motion is satisfied. In some embodiments, the minimum range of motion comprises a rotation or tilt of at least a minimum number of degrees in each of one or more planes. In some embodiments, one or more lighting parameters of the image capture device are dynamically adjusted during capture of the sequence of images and a signal associated with a region of interest in the physical document is assessed, and the user of the mobile computing device is instructed to continue rotating or tilting the physical document or the image capture device until a minimum amount of signal associated with the region of interest is captured and the minimum range of motion is satisfied. In some embodiments, the mobile computing device dynamically adjusts the one or more lighting parameters based upon one or more of: ambient lighting conditions, physical document characteristics, or amount of captured signal associated with the region of interest.

In some embodiments, tracking the physical document throughout the sequence of images comprises determining, for each image in the sequence of images, at least one of a location or a six-dimensional pose of the physical document in the image. In some embodiments, the one or more imaging conditions comprise at least one or more of: lighting conditions, focus, or control attributes of the image capture device. In some embodiments, the one or more operational parameters comprise at least one or more of: shutter speed, ISO speed, gain, aperture, flash intensity, flash duration, or light balance.

In some embodiments, selecting one or more images from the sequence of images comprises determining, for each image in the sequence of images, whether the image is usable or unusable for authentication, and discarding the image when the image is determined as unusable. In some embodiments, an image is determined to be unusable when: at least a portion of the physical document is occluded or missing, a viewing angle of the physical document exceeds a defined threshold, the image includes noise that exceeds a defined threshold, or at least a portion of the image is blurry. In some embodiments, identifying a region of interest in the physical document using the selected images comprises, for each image in the selected images: detecting a location of the physical document in the image; estimating a pose of the physical document in the image; cropping a portion of the image based upon the detected location and the pose of the physical document; estimating one or more characteristics of the physical document based upon the cropped portion of the image; and aligning the cropped images based upon one or more of the estimated characteristics of the physical document in each cropped image. In some embodiments, the mobile computing device identifies the region of interest in each of the aligned images based upon predefined coordinate values.

In some embodiments, the region of interest comprises an optical variable device (OVD). In some embodiments, reconstructing the region of interest using the selected images comprises executing one or more of a robust principal component analysis (PCA) algorithm or a learned alternative mapping on the selected images to reconstruct the region of interest. In some embodiments, the sequence of images of the physical document comprises a plurality of images of a front side of the physical document and a plurality of images of a back side of the physical document.

In some embodiments, generating an authentication score for the document using the reconstructed region of interest comprises executing one or more machine learning classification models using one or more features of the reconstructed region of interest as input to generate a classification value for the document. In some embodiments, the one or more machine learning classification models comprise one or more of: deep learning models, Random Forest algorithms, Support Vector Machines, neural networks, or ensembles thereof. In some embodiments, the classification value comprises at least one of a probability that the document is authentic, a confidence score that indicates whether the document is authentic, or a similarity metric that indicates whether the document is authentic. In some embodiments, at least one of the one or more machine learning classification models is a convolutional neural network. In some embodiments, the one or more machine learning classification models is an ensemble classifier comprised of a plurality of convolutional neural networks. In some embodiments, one or more interpretable methods are used to validate the classification value. In some embodiments, the one or more interpretable methods comprise occlusion of at least a portion of the document, perturbation of at least a portion of the document, or analysis of a heatmap of at least a portion of the document. In some embodiments, an output of the one or more interpretable methods comprises an identification of the reconstructed region of interest that represents proof of the document being genuine or fraudulent. In some embodiments, the one or more machine learning classification models are trained using a plurality of genuine documents, a plurality of fraudulent documents, or both. In some embodiments, the classification value generated by the one or more machine learning classification models is a measure of similarity between one or more of the plurality of genuine documents, one or more of the plurality of fraudulent documents, or both.

In some embodiments, the mobile computing device preprocesses the sequence of images received from the image capture device prior to selecting the one or more images. In some embodiments, preprocessing the sequence of images comprises one or more of: assessing video quality metrics for the entire sequence of images, detecting a location of the physical document in each image of the sequence of images, and determining one or more quality metrics for each image in the sequence of images. In some embodiments, the video quality metrics comprise a length of the sequence of images, a frames-per-second (FPS) value associated with the sequence of images, and an image resolution associated with the sequence of images. In some embodiments, the one or more quality metrics comprise (i) global image quality metrics including one or more of: glare, blur, white balance, or sensor noise characteristics, (ii) local image quality metrics including one or more of: blur, sharpness, text region confidence, character confidence, or edge detection, or (iii) both the global image quality metrics and the local image quality metrics. In some embodiments, the sensor noise characteristics comprise one or more of: blooming, readout noise, or custom calibration variations.

The invention, in another aspect, features a system for authentication of a physical document. The system comprises a mobile computing device coupled to an image capture device. The mobile computing device captures, using the image capture device, images of a physical document in a scene, during which the mobile computing device adjusts one or more operational parameters of the image capture device, resulting in a sequence of images captured using different capture settings. The mobile computing device partitions the sequence of images into one or more subsets of images, wherein each subset comprises images with a similar alignment of the physical document and captured using the same capture settings. The mobile computing device processes the subsets of images to identify a region of interest in each image. The mobile computing device generates a representation of the identified region of interest using the processed images. The mobile computing device generates an authentication score for the document using the representation of the identified region of interest. The mobile computing device determines whether the physical document is authentic based upon the authentication score.

The invention, in another aspect, features a computerized method of authentication of a physical document. An image capture device, coupled to a mobile computing device, captures images of a physical document in a scene, during which the mobile computing device adjusts one or more operational parameters of the image capture device, resulting in a sequence of images captured using different capture settings. The mobile computing device partitions the sequence of images into one or more subsets of images, wherein each subset comprises images with a similar alignment of the physical document and captured using the same capture settings. The mobile computing device processes the subsets of images to identify a region of interest in each image. The mobile computing device generates a representation of the identified region of interest using the processed images. The mobile computing device generates an authentication score for the document using the representation of the identified region of interest. The mobile computing device determines whether the physical document is authentic based upon the authentication score.

Any of the above aspects can include one or more of the following features. In some embodiments, the one or more operational parameters comprise one or more of shutter speed, ISO speed, gain and offset, aperture, flash intensity, flash duration, or light balance. In some embodiments, the physical document is stationary during capture of the images by the mobile computing device. In some embodiments, the physical document remains in a stationary position relative to the image capture device during capture of the images by the mobile computing device.

In some embodiments, prior to capturing a first image of the physical document in the scene, the mobile computing device generates baseline operational parameters of the image capture device based upon one or more imaging conditions associated with the physical document. In some embodiments, adjusting one or more operational parameters of the image capture device comprises adjusting the baseline operational parameters between capturing each image in the sequence of images. In some embodiments, adjusting the baseline operational parameters between capturing each image comprises receiving operational parameters used for the previous image and using the received operational parameters to adjust the baseline operational parameters as part of a dynamic feedback loop.

In some embodiments, the mobile computing device preprocesses the sequence of images received from the image capture device prior to partitioning the sequence of images. In some embodiments, preprocessing the sequence of images comprises one or more of: assessing video quality metrics for the entire sequence of images, detecting a location of the physical document in each image of the sequence of images, and determining one or more quality metrics for each image in the sequence of images. In some embodiments, the video quality metrics comprise a length of the sequence of images, a frames-per-second (FPS) value associated with the sequence of images, and an image resolution associated with the sequence of images.

In some embodiments, the one or more quality metrics comprise (i) global image quality metrics including one or more of: glare, blur, white balance, or sensor noise characteristics, (ii) local image quality metrics including one or more of: blur, sharpness, text region confidence, character confidence, or edge detection, or (iii) both the global image quality metrics and the local image quality metrics. In some embodiments, the sensor noise characteristics comprise one or more of: blooming, readout noise, or custom calibration variations.

In some embodiments, processing the selected images to identify a region of interest in each image comprises normalizing an image signal of each image. In some embodiments, normalizing an image signal of each image comprises amplifying the image signal associated with a region of interest on the physical document and reducing the image signal associated with a background of the physical document.

In some embodiments, generating a representation of the identified region of interest comprises executing one or more of a robust principal component analysis (PCA) algorithm or a learned alternative mapping on the image to reconstruct the region of interest. In some embodiments, generating an authentication score for the document using the reconstructed region of interest comprises executing one or more machine learning classification models using one or more features of the reconstructed region of interest as input to generate a classification value for the document. In some embodiments, the classification value comprises at least one of a probability that the document is authentic, a confidence score metric that indicates whether the document is authentic, or a similarity metric that indicates whether the document is authentic. In some embodiments, at least one of the one or more machine learning classification models is a convolutional neural network. In some embodiments, the one or more machine learning classification models is an ensemble classifier comprised of a plurality of convolutional neural networks. In some embodiments, one or more interpretable methods are used to validate the classification value. In some embodiments, the one or more interpretable methods comprise occlusion of at least a portion of the document, perturbation of at least a portion of the document, or analysis of a heatmap of at least a portion of the document. In some embodiments, an output of the one or more interpretable methods comprises an identification of the reconstructed region of interest that represents proof of the document being genuine or fraudulent.

In some embodiments, the one or more machine learning classification models are trained using a plurality of genuine documents, a plurality of fraudulent documents, or both. In some embodiments, the classification value generated by the one or more machine learning classification models is a measure of similarity between one or more of the plurality of genuine documents, one or more of the plurality of fraudulent documents, or both. In some embodiments, the images of the physical document comprise one of: images of a front side of the physical document or images of a back side of the physical document.

Other aspects and advantages of the invention will become apparent from the following detailed description, taken in conjunction with the accompanying drawings, illustrating the principles of the invention by way of example only.

BRIEF DESCRIPTION OF THE DRAWINGS

The advantages of the invention described above, together with further advantages, may be better understood by referring to the following description taken in conjunction with the accompanying drawings. The drawings are not necessarily to scale, emphasis instead generally being placed upon illustrating the principles of the invention.

FIG. 3 is a flow diagram of a computerized method of preprocessing incoming images to identify suitable images for analysis.

FIG. 5 a flow diagram of a computerized method for feature descriptor generation and keypoint matching.

FIG. 10 is a diagram of exemplary candidate images selected by document authentication module.

FIG. 11 is a diagram of exemplary normalized images as generated by document authentication module from candidate images.

DETAILED DESCRIPTION

Figure 1:
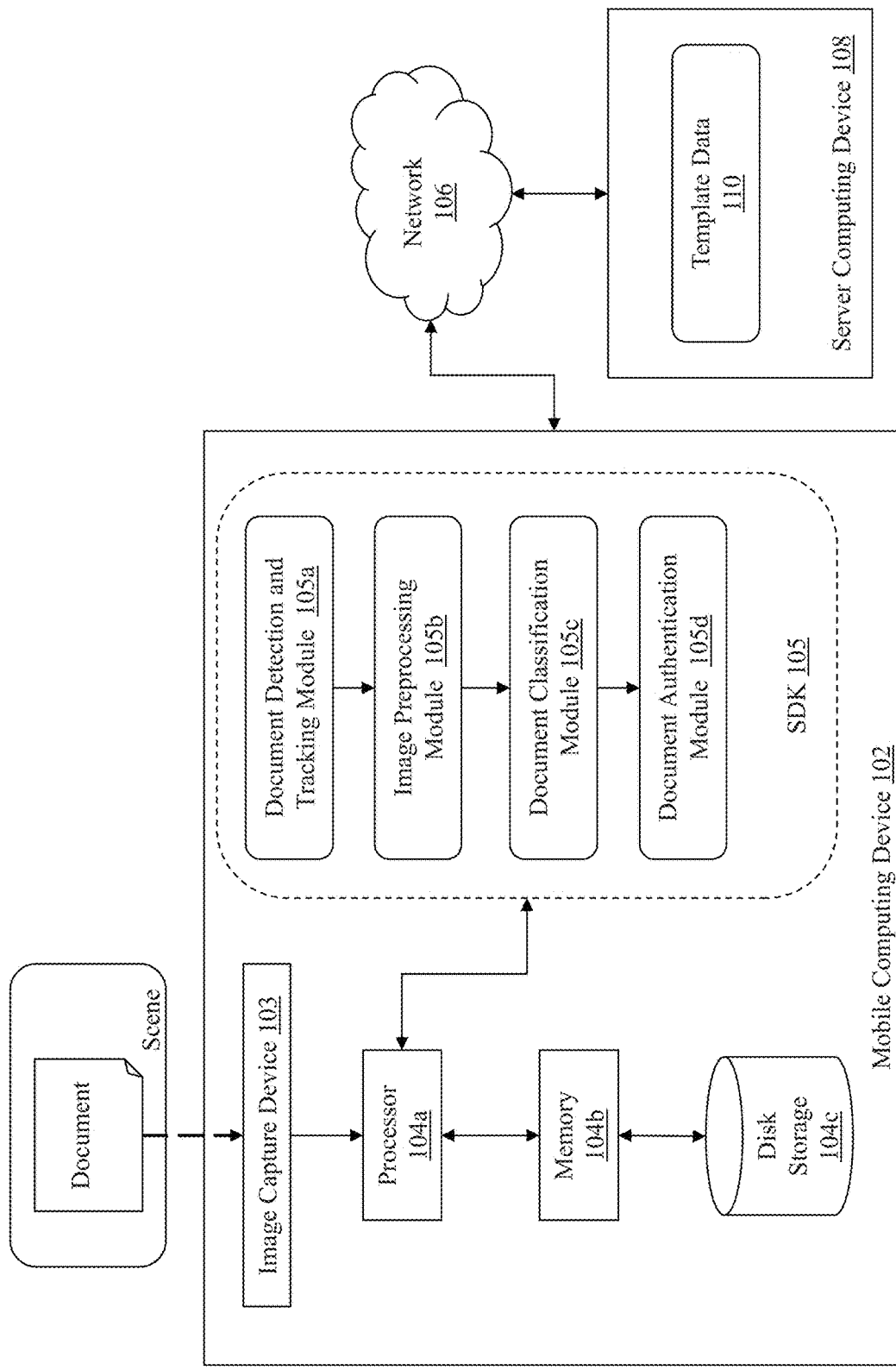
FIG. 1 is a block diagram of a system for authentication of a physical document.

FIG. 1 is a block diagram of a system 100 for authentication of a physical document. The system 100 includes a mobile computing device 102 that comprises image capture device 103, processor 104a, memory 104b, disk storage 104c, and software development kit (SDK) 105. The SDK 105 includes a plurality of modules: document detection and tracking module 105a, image preprocessing module 105b, document classification module 105c, and document authentication module 105d. The mobile computing device 102 is coupled to server computing device 108 via network 106. Server computing device 108 comprises template data 110. Image capture device 103 is configured to capture video and/or still images of a document in a scene.

The mobile computing device 102 is a device including specialized hardware and/or software modules (e.g., SDK 105 and corresponding modules 105a-105d) that execute on processor 104a and interact with memory 104b and disk storage 104c of the computing device 102, to receive, process, and transmit data, and perform functions for authentication of a physical document as described herein. In some embodiments, the SDK 105 and its modules 105a-105d are specialized sets of computer software instructions programmed onto one or more dedicated processors (e.g., processor 104a) in the mobile computing device 102 and can include specifically-designated memory locations and/or registers for executing the specialized computer software instructions. In one embodiment, the SDK 105 comprises a single software application (e.g., an 'app') or plug-in that is installed on the mobile computing device 102.

The mobile computing device 102 also comprises an image capture device 103. In some embodiments, the image capture device 103 comprises a camera that is capable of capturing video and/or still images of a scene. For example, a user of mobile computing device 102 may place a document in the field of view of image capture device 103 and instruct mobile computing device 102 to record video of the document using image capture device 103. As shown in FIG. 1, image capture device 103 is integrated into mobile computing device 102—an example might be a smartphone that includes an embedded camera. It should be appreciated that in other embodiments, image capture device 103 may be a separate device from mobile computing device 102, which is coupled to mobile computing device 102 via a wired or wireless connection.

Exemplary computing devices 102 include, but are not limited to, tablets, smartphones, laptop computers, and the like. It should be appreciated that other types of computing devices (e.g., desktop computers, Internet of Things (IoT) devices, smart appliances, wearables) that are capable of connecting to the components of the system 100 can be used without departing from the scope of invention. Although FIG. 1 depicts a single mobile computing device 102, it should be appreciated that the system 100 can include any number of mobile computing devices.

As mentioned above, in some embodiments SDK 105 comprises an application that is installed on mobile computing device 102—also called a native application or "app". The native application can be a software application is installed locally on mobile computing device 102 and written with programmatic code designed to interact with an operating system that is native to mobile computing device 102. Such software may be available for download onto the device 102 from, e.g., the Apple® App Store or the Google® Play Store. In some embodiments, SDK 105 and its modules 105a-105d are executed by processor 104a to perform functions associated with authentication of a physical document as described herein. The native application can be executed when the mobile computing device 102 is online—that is, communicatively coupled to network 106—or offline. In some embodiments, the offline mode feature can provide a benefit to the security and usability of the document authentication process described herein—such as enabling verification of documents in situations where a network connection is not available, or where transmission of sensitive document verification data over a network is not desired (e.g., where a threat actor may try to intercept or misappropriate such data).

It should be appreciated that, in some embodiments, SDK 105 and/or one or more of its modules 105a-105d can be provided via a browser application, which comprises software executing on processor 104a of mobile computing device 102 that enables mobile computing device 102 to communicate via HTTP or HTTPS with remote servers addressable with URLs (e.g., web servers) to receive website-related content, including one or more webpages that contain user interface content, for rendering in the browser application and presentation on a display device coupled to mobile computing device 102. Exemplary mobile browser application software includes, but is not limited to, Firefox™ Chrome™, Safari™, and other similar software. The one or more webpages can comprise visual and audio content for display to and interaction with a user of device 102, including application functionality for authentication of a physical document.

Although SDK 105 and its modules 105a-105d are shown in FIG. 1 as executing within a single mobile computing device 102, in some embodiments the functionality of one or more of the modules 105a-105d of SDK 105 can be distributed among a plurality of computing devices. It should be appreciated that, in some embodiments, certain mobile computing devices may lack sufficient hardware or software capability—such as processing power, data storage capacity, communication circuitry, operating system features—to satisfactorily execute the SDK 105 and/or one or more of the computing modules 105a-105d. For example, an older model mobile device 102 may not be able to perform all steps of the document analysis and verification processes described herein within a desired or reasonable time frame. Therefore, in some embodiments, one or more of the modules 105a-105d of SDK 105 may be implemented on one or more separate computing devices (such as server computing device 108). In these embodiments, mobile computing device 102 can communicate with server computing device 108 via network 106 in order to carry out the functions and processing steps for authentication of a physical document as described herein.

As shown in FIG. 1, processor 104a of mobile computing device 102 enables modules 105a-105d of SDK 105 to communicate with each other, and also coordinates communications with image capture device 103, memory 104b, disk storage 104c, network 106, and server computing device 108 in order to exchange data for the purpose of performing the described functions. It should be appreciated that any number of computing devices, arranged in a variety of architectures, resources, and configurations (e.g., networked computing, cluster computing, virtual computing, cloud computing) can be used without departing from the scope of the technology described herein. The exemplary functionality of SDK 105 and its modules 105a-105d is described in detail throughout this specification.

Communications network 104 enables the other components of the system 100 to communicate with each other in order to perform the process of authentication of a physical document as described herein. Network 104 may be a local network, such as a LAN, or a wide area network, such as the Internet and/or a cellular network. In some embodiments, network 104 is comprised of several discrete networks and/or sub-networks (e.g., cellular to Internet) that enable the components of the system 100 to communicate with each other.

Server computing device 108 is a combination of hardware, including one or more special-purpose processors and one or more physical memory modules, and specialized software modules that execute on one or more processors of server computing device 108, to receive data from and transmit data to other components of the system 100, and perform functions for authentication of a physical document as described herein. Server computing device 108 includes template data 110, which can comprise data (images, descriptors, other features) corresponding to template documents (i.e., documents that are known to be authentic and are used as references to verify the authenticity of documents presented to mobile computing device 102). In some embodiments, mobile computing device 102 connects to server computing device 108 using an application programming interface (API) in order to request and retrieve template data 110 from server computing device 108. For example, mobile computing device 102 can periodically download updates to template data 110 from server computing device 108 and store the received template data 110 in, e.g., memory 104b and/or disk storage 104c, for subsequent use by mobile computing device 102 to authenticate documents as described herein.

The document verification techniques described herein can be implemented using two different workflows: Active Document Liveness (ADL) and Passive Document Liveness (PDL). Generally and without limitation, Active Document Liveness comprises a document verification workflow where a physical document is presented to mobile computing device 102 and video of the physical document is captured by image capture device 103 as the physical document and/or mobile computing device 102 is moved and/or rotated. In some embodiments, physical lighting features can rotate or move in relation to the physical document and/or mobile computing device. Movement or rotation of the physical document and/or mobile computing device 102 (particularly in relation to certain lighting conditions) can cause one or more security features (such as OVDs) on the physical document to become visible or invisible, change color, change appearance, and so forth. To accomplish this, in some ADL embodiments the user of mobile computing device 102 is instructed to hold the physical document in view of the image capture device 103 and rotate or tilt the physical document along one or more axes, or place the physical document in view of image capture device 103 and rotate or tilt mobile computing device 102 along one or more axes, to capture the document from various angles and perspectives. Also, in some ADL embodiments, mobile computing device 102 can detect baseline imaging conditions (e.g., light intensity, glare, blur, white balance, sensor noise characteristics such as blooming, readout noise, or custom calibration variations, focus, etc.) and/or changes in imaging conditions associated with the physical document and adjust operational parameters of image capture device 103 (e.g., flash, aperture, pixel gain, etc.) accordingly as will be described in detail herein.

Generally and without limitation, Passive Document Liveness comprises a document verification workflow where a physical document is presented to mobile computing device 102 and video of the physical document is captured by image capture device 103. Typically in PDL applications, the physical document and mobile computing device 102 remains stationary during video capture but one or more operational parameters and/or capture settings of image capture device 103 (e.g., flash intensity, flash duration, shutter speed, ISO speed, gain, aperture, light balance, etc.) are modified or adjusted for different frames of the video, in order to cause one or more security features (such as OVDs) on the physical document to become visible or invisible, change color, change appearance, and so forth. In some embodiments, mobile computing device 102 analyzes frames of the video as the frames are being captured and automatically adjusts operational parameters and/or capture settings of image capture device 103 to generate a set of frames with varying imaging conditions, lighting conditions, and/or image characteristics.

It should be appreciated that the above descriptions of ADL and PDL are merely intended to illustrate examples of such applications, and are not intended to limit the methods and systems described herein. Also, in some embodiments, aspects of each of the ADL and PDL workflows described herein can be combined into a single workflow for document verification. As one example, the systems and methods can execute an ADL or a PDL workflow on a physical document which results in an inconclusive verification result—in which case the systems and methods can then execute the other type of workflow on the same physical document to determine whether the document can be authenticated. As another example, the systems and methods can execute both an ADL workflow and a PDL workflow on a physical document, generate an authentication score associated with each workflow, and then use one or both of the authentication scores to determine whether the physical document is authentic. As another example, the systems and methods can execute an ADL workflow on a particular portion of the physical document, or a specific security feature of the physical document, and then execute a PDL workflow on a different portion or security feature of the physical document, in order to determine whether the document is authentic. As can be understood, these examples are merely illustrative and other combinations of the ADL and PDL workflows described herein may be used within the scope of the technology.

Active Document Liveness

Figure 2:
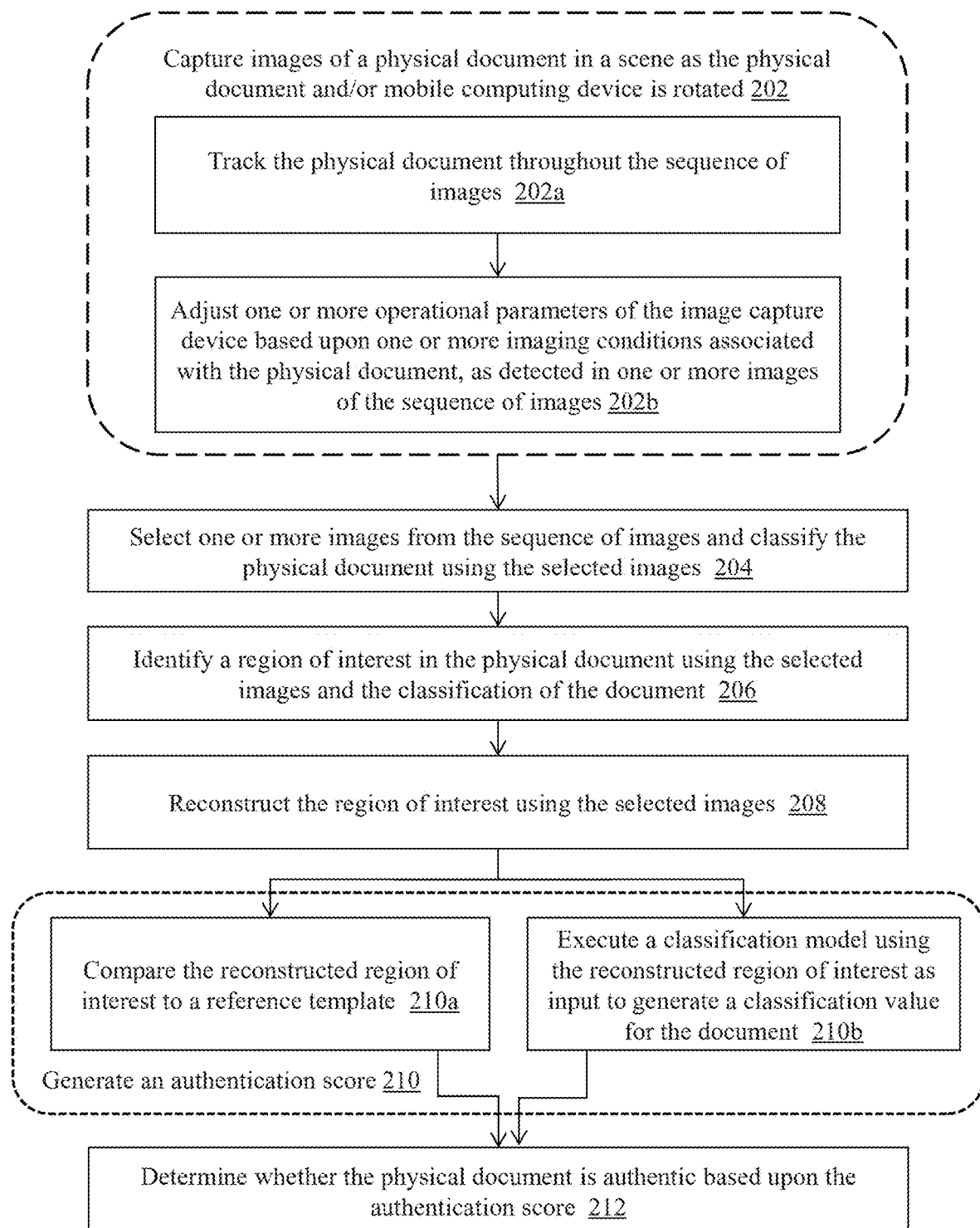
FIG. 2 is a flow diagram of a computerized method of authentication of a physical document using an Active Document Liveness process where the physical document is moved and/or rotated during image capture.

FIG. 2 is a flow diagram of a computerized method 200 of authentication of a physical document using an Active Document Liveness process where at least one of the physical document or mobile computing device is moved and/or rotated during image capture, using the system 100 of FIG. 1. As mentioned above, an exemplary ADL process can be where a human user (e.g., a security agent at a checkpoint) that is operating mobile computing device 102 can hold the physical document in view of image capture device 103 and instruct mobile computing device 102 to capture a video comprising a sequence of frames of the physical document. During capture of the video, the human user rotates the physical document or mobile computing device 102 in one or more axes (e.g., x-axis, y-axis, z-axis) or planes, so that different frames of the video capture different angles or perspectives of the physical document. For example, the user can hold the physical document so that the front of the document is parallel to a viewing plane of image capture device 103 and then tilt the physical document from left to right (along the x-axis), forwards to backwards (along the y-axis), etc. as video is being captured. In another example, the user can hold the physical document and then rotate or tilt mobile computing device 102 from left to right (along the x-axis), forwards to backwards (along the y-axis), etc. as video is being captured. In some embodiments, mobile computing device 102 instructs the user (e.g., via indicia displayed on a screen of mobile device 102) as to certain angles, positions, or ranges of tilt and/or motion that are necessary or desirable to capture as part of the video in order to have sufficient frames for proper analysis and verification of the document as described herein. In one example, SDK 105 may require that the document and/or mobile computing device 102 is tilted at least a predetermined number of degrees (e.g., 5, 10, 15, 20, 25, 30, etc.) in each plane (left, right, forward, backward) in order to have sufficient frames for analysis. In some embodiments, SDK 105 can determine a minimum range of motion dynamically prior to or during image capture based upon, e.g., ambient lighting conditions such as a number of light sources, operational parameters of image capture device 103, and so forth to tightly optimize maximization of signal with minimum motion to ensure that the user experience is simple.

A user operates mobile computing device 102 to capture (step 202) images of a physical document in a scene as the physical document and/or mobile computing device 102 is rotated. As can be appreciated, in some embodiments, the images comprise a video stream or video file with a sequence of images (also called frames). In some embodiments, the video must be of a minimum length or duration (e.g., 15 seconds) and with a minimum frames-per-second value (e.g., 60 FPS). As can be appreciated, encoding in a video is very different from encoding single images and in some cases video encoding is lossy. Therefore, in some embodiments, the images are not captured as a video stream or video file, but instead are captured as a sequence of single images. When the images are captured as single images, image capture module 103 may trigger a separate autofocus loop for each image. As can be understood, embodiments, techniques, algorithms and examples are provided throughout this specification which refer to capture and analysis of a video stream or video file; however, these embodiments, techniques, algorithms and examples are equally applicable to a sequence of individual images. As the frames are captured by image capture device 103, processor 104a transmits the frames to SDK 105 for analysis and processing.

It should be appreciated that, in some embodiments, mobile computing device 102 performs several operations prior to capturing video of the document that will be used for authentication. For example, mobile computing device 102 can analyze one or more images captured image capture device 103 in order to perform steps such as: detecting whether a document is in view of image capture device 103; identifying a location, position, and/or pose (e.g., in six degrees of freedom) of the document; assessing physical and/or material properties of the document; assessing background lighting conditions and document lighting conditions; classifying the document type; and the like.

Document detection and tracking module 105a detects that a document is in view of image capture device 103, identifies a location of the physical document in one or more frames and tracks (step 202a) the document throughout one or more frames. In some embodiments, document detection and tracking module 105a uses a machine learning framework, such as deep learning models, Random Forest algorithms, Support Vector Machines, neural networks, or ensembles thereof, to detect that a document is present, locate the document in the scene, and track the document throughout one or more frames. Exemplary machine learning frameworks that can be implemented in document detection and tracking module 105a include, but are not limited to, TensorFlow Lite™ (TFLite) from Google, Inc., Caffe2™ from Meta, Inc. (formerly Facebook, Inc.), or Core ML™ from Apple, Inc. Document detection and tracking module 105a can be configured to execute a object detection machine learning model (such as a convolutional neural network (CNN) or a single feed-forward deep neural network) on the incoming frames to detect the physical document, locate, and track the position and orientation of the physical document in the scene, as well as other non-document features such as background and the like. Any of a number of different exemplary deep learning object detection algorithms can be used by module 105a to identify the location of the physical document in the frames, including but not limited to: (i) one shot detectors as described in J. Redmon et al., "You Only Look Once: Unified, Real-Time Object Detection," arXiv:1506.02640v5 [cs.CV] 9 May 2016, available at arxiv.org/pdf/1506.02640.pdf, and W. Liu et al., "SSD: Single Shot MultiBox Detector," arXiv: 1512.02325v5 [cs.CV] 29 Dec. 2016, available at arxiv.org/pdf/1512.02325.pdf (each of which is incorporated herein by reference); and (ii) two stage detectors as described in S. Ren et al., "Faster R-CNN: Toward Real-Time Object Detection with Region Proposal Networks," arXiv: 1506.01497v1 [cs.CV] 4 Jun. 2015, available at arxiv.org/pdf/1506.01497v1.pdf, which is also incorporated herein by reference. It should be appreciated that machine learning object detection models, such as deep learning frameworks, are now accurate and fast enough to run on mobile devices, as described in A. G. Howard et al, "MobileNets: Efficient Convolutional Neural Networks for Mobile Vision Applications," arXiv:1704.0486v1 [cs.CV] 17 Apr. 2017, available at arxiv.org/pdf/1704.04861.pdf, which is incorporated herein by reference.

Upon detecting and locating the physical document, document detection and tracking module 105a tracks the physical document in the scene throughout the frames. Exemplary object tracking algorithms and approaches that can be used by module 105a to track the physical document are described in the following publications: (i) N. Wojke et al., "Simple Online and Realtime Tracking with a Deep Association Metric," arXiv:1703.07402v1 [cs.CV] 21 Mar. 2017, available at arxiv.org/pdf/1703.07402.pdf; (ii) P. Bergmann et al., "Tracking without bells and whistles," arXiv: 1903.05625v3 [cs.CV] 17 Aug. 2019, available at arxiv.org/pdf/1903.05625.pdf; (iii) G. Ciaparrone et al., "Deep Learning in Video Multi-Object Tracking: A Survey," arXiv: 1907.12740v4 [cs.CV] 19 Nov. 2019, available at arxiv.org/pdf/1907.12740.pdf; (iv) E. Bochinski et al., "Extending IOU Based Multi-Object Tracking by Visual Information" (2018), available at elvera.nue.tu-berlin.de/files/1547Bochinski2018.pdf; (v) X. Zhou et al., "Tracking Objects as Points," arXiv:2004.01177v2 [cs.CV] 21 Aug. 2020, available at arxiv.org/pdf/2004.01177.pdf; and (vi) Y. Yoon et al., "Online Multiple Pedestrians Tracking using Deep Temporal Appearance Matching Association" arXiv: 1907.00831v4 [cs.CV] 9 Oct. 2020, available at arxiv.org/pdf/1907.00831.pdf. Each of the above publications is incorporated herein by reference. Further object tracking approaches that can be utilized by module 105a are described in S. Mallick, "Object Tracking using OpenCV (C++/Python)," Feb. 13, 2017, available at learnopencv.com/object-tracking-using-opencv-cpp-python/, which is incorporated herein by reference.

As document detection and tracking module 105a tracks the physical document throughout the one or more images, module 105a also assesses imaging conditions in the images in order to dynamically adjust (step 202b) one or more operational parameters of image capture device 103 based upon one or more imaging conditions associated with the physical document, as detected in one or more images of the sequence of images. In some embodiments, document detection and tracking module 105a compares imaging conditions such as lighting characteristics of the background in the image with lighting characteristics of the document and adjusts operational parameters of image capture device 103 based upon the comparison. For example, if the background of the image is very bright and the document is dark relative to the background, document detection and tracking module 105a can adjust exposure settings of image capture device 103 to ensure that the maximum possible image signal is acquired from the document. A variety of different approaches can be used by document detection and tracking module 105a to adjust operational parameters of image capture device 103, such as 1) a rule-based approach (e.g., if background and/or document brightness falls within a range of values and/or a threshold value, adjust exposure settings accordingly to maximize signal from the document); 2) a machine learning model trained on a labelled data set; and/or 3) an end-to-end regression model trained on data. Each of these approaches is described in more detail below.

Rule-Based Approach: In some embodiments, the rule-based approach leverages heuristics to define capture settings of image capture device 103 given a set of assessed input criteria. An exemplary set of assessed and defined input criteria are as follows:

- If ambient light is too bright, module 105a can adjust image capture device 103 parameters to reduce exposure setting and gain;
- If conditions are too dark, module 105a can instruct image capture device 103 to capture subsequent/additional frames using increasing flash intensity, and/or increase exposure settings of image capture device 103;
- If there is glare present on the document in the frame, module 105a can reduce exposure settings of image capture device 103 and/or reduce gain parameters for image capture device 103.

Machine Learning Model Trained on Labelled Data Set: In some embodiments, the approach using a machine learning (ML) model trained on a labelled data set moves beyond the simple heuristics of the rule-based approach to utilize deep learning to convert certain lighting characteristics of the incoming frame(s) into multidimensional embeddings and feed the embeddings to a trained classification model executed by module 105a which evaluates the embeddings using weights adjusted for frames taken with known capture settings to determine whether the incoming frame(s) have sufficient lighting parameters or not to be usable for document verification. In this approach, the classification model can determine one or more parameter adjustments for image capture device 103 and module 105a then adjusts capture parameters for subsequent frames to achieve image capture that falls within acceptable lighting conditions. Exemplary frameworks that can be used by module 105a to analyze lighting conditions using the machine learning model approach are described in the following publications: (i) K. He et al., "Deep Residual Learning for Image Recognition," arXiv:1512.03385v1 [cs.CV] 10 Dec. 2015, available at arxiv.org/pdf/1512.03385v1.pdf; (ii) C. Szegedy et al., "Rethinking the Inception Architecture for Computer Vision," arXiv:1500567v3 [cs.CV] 11 Dec. 2015, available at arxiv.org/pdf/1512.00567v3.pdf; (iii) M. Tan & Q. V. Lee, "EfficientNet: Rethinking Model Scaling for Convolutional Neural Networks," "arXiv:1905.11946v5 [cs.LG] 11 Sep. 2020, available at arxiv.org/pdf/1905.11946.pdf; and (iv) C. Wang et al., "EfficientNet-eLite: Extremely Lightweight and Efficient CNN Models for Edge Devices by Network Candidate Search," arXiv:2009.07409v1 [cs.CV] 16 Sep. 2020, available at arxiv.org/pdf/2009.07409v1.pdf. Each of the above publications is incorporated herein by reference.

End-to-End Regression Model: In some embodiments, the approach using an end-to-end regression model trained on data enables the most effective control of the scene and capture settings of image capture device 103. Module 105a executes a trained deep learning regression model to perform end-to-end regression of the lighting conditions and capture settings given any scene, and the regression model can optimize for the specifics of the scene so as to maximize the signal acquired from the document and/or OVD while suppressing noise due to visual/optical phenomena. Exemplary approaches that can be leveraged by module 105a to implement the end-to-end regression model are described in C. Kim et al., "End-to-end deep learning-based autonomous driving control for high-speed environment," The Journal of Supercomputing 78, 1961-1982 (2022), doi.org/10.1007/s11227-021-03929-8, and R. Polvara et al., "Toward End-to-End Control for UAV Autonomous Landing via Deep Reinforcement Learning," 2018 International Conference on Unmanned Aircraft Systems (ICUAS), Jun. 12-15, 2018, DOI: 10.1109/ICUAS.2018.8453449, each of which is incorporated herein by reference.

As mentioned above, in some embodiments document detection and tracking module 105a also assesses physical properties of the document in the images in order to adjust operational parameters and/or capture settings of image capture device 103. As can be appreciated, the document may be comprised of any of a variety of different physical materials—such as paper, plastic (e.g., polyvinyl chloride (PVC), polyethylene terephthalate (PET)), clear laminate layers, etc. Given the different reflective characteristics of these and other materials, document detection and tracking module 105a can adjust operational parameters and/or capture settings of image capture device 103 to ensure that the maximum possible image signal is acquired from the document. For example, document detection and tracking module 105a can be configured to utilize a deep learning classification model that is trained on surface properties of different materials in images to evaluate the incoming frames, classify a likely composition/material of the document depicted in the frames, and adjust operational parameters to adjust capture settings. An exemplary deep learning classification model that can be used by module 105a for texture and physical material classification is described in P. Simon and U. V., "Deep Learning based Feature Extraction for Texture Classification," Third International Conference on Computing and Network Communications (CoCoNet'19), Procedia Computer Science 171 (2020), pp. 1680-1687 (2020), which is incorporated herein by reference. Also, the above-referenced frameworks for analyzing lighting conditions using the machine learning model approach (i.e., He, Szegedy, Tan, Wang, and Gao supra), can similarly be applied to the physical properties context.

Also, during image capture, it should be appreciated that some of the images may not be suitable for analysis and verification due to certain deficiencies (blurriness, out of focus, glare, etc.) that introduce undesirable noise and thus degrade the image quality such that the document and its features cannot be identified, tracked, or verified adequately. Generally, noise can be broken into two categories: intrinsic noise and extrinsic noise. Intrinsic noise is noise arising from the document itself, such as smudges on the document, inconsistent printing of OVDs/holograms, plastic folds on the document, or shiny plastic reflections that can be confused with an OVD. Extrinsic noise is noise arising from the image/data acquisition process, such as glare (i.e., oversaturation from a light source on the document), blur, focus, low quality video, white balance, or other image sensor noise (e.g., blooming, readout noise, or custom calibration variations).

In other instances, certain frames may not be usable for verification purposes because the angle of the document in the frame is too extreme, or the document is partially cut off (and thus the document cannot be properly analyzed). FIG. 3 is a flow diagram of a computerized method 300 of preprocessing incoming images to identify suitable images for analysis, using the system 100 of FIG. 1. As shown in FIG. 3, image preprocessing module 105b of SDK 105 can either receive (step 302) video of the physical document from document detection and tracking module 105a after the document is detected and located, or receive video directly from image capture device 103, and analyze certain quality metrics of the video frames to discard frames that do not meet the necessary or desired quality. In some embodiments, image preprocessing module 105b can perform (step 304) a basic video quality check to confirm attributes such as video length, frames per second, resolution, and the like meet or exceed minimum values (and/or fall below maximum values) that are considered adequate by module 105b. In addition, in some embodiments image preprocessing module 105b analyzes (step 306) image quality metrics of the frames at a temporal level, at a global quality level, at a local quality level, or any combination thereof. In some embodiments, module 105b can use a deep frame selector to identify a candidate frame to use for classification from each capture segment of the video and/or run a trained deep learning classifier to assess the quality metrics for one or more frames (e.g., whether enough holographic information has been captured in the selected frames and/or throughout the video).

Temporal quality metrics can include, but are not limited to, jitter, motion measurement, etc. As can be appreciated, motion blur can be introduced into one or more images due to image capture device 103 captures an image when the document is moving (e.g., the user's hand and/or mobile computing device 102 moves slightly or moderately as the document is being rotated during video capture). Image preprocessing module 105b can analyze a sequence of frames and measure motion of the document across frames, then select a subgroup of frames that have a lower amount of motion and discard another subgroup of frames that have a higher amount of motion (or variability of motion). In addition, this approach can be beneficial to reduce the searching space so that SDK 105 can perform more efficiently in locating the document in the images. Global image quality metrics relate to quality characteristics of the image as a whole and can include, but are not limited to, glare, blur, white balance, resolution, sensor noise characteristics such as blooming, readout noise, or custom calibration variations, and the like. Local image quality metrics relate to quality characteristics of certain portions of the image and can include, but are not limited to, low-level blur, low-level sharpness, text region confidence, character confidence, edge detection, and the like.

In some embodiments, image preprocessing module 105b factors each of the above quality metrics when generating (step 308) an overall quality score for each image, then discards (step 310) images from the video that do not meet a particular quality score value. For example, image preprocessing module 105b can execute a deep learning model to rank each image according to the quality of the image, taking into account such factors as size of the physical document in the image, temporal metrics, global quality metrics, local quality metrics, etc. The deep learning model returns a score which is used by image preprocessing module 105b and/or document detection and tracking module 105a to identify one or more frames that have a high likelihood of being processed and classified correctly by the SDK 105.

It should be appreciated that, in some embodiments, image preprocessing module 105b can perform its functions on the incoming frames before document detection and tracking module 105a, or vice versa. In some embodiments, document detection and tracking module 105a and image preprocessing module 105b can operate on incoming frames in parallel to identify a particular subset of frames to be used for document classification and verification as described herein.

As described above, document detection and tracking module 105a and image preprocessing module 105b analyze the incoming images of the video to select (step 204) one or more images from the sequence of images in the video. As mentioned above, in some embodiments these incoming images can be separate from the video captured by image capture device 103 and used by module 105d to authenticated the document (as described later in the specification). Using one or more images of these selected images, document classification module 105c classifies (also step 204) the physical document in the image(s) as a particular document type. In some embodiments, document classification module 105c crops the selected images to the region of the image that comprises the physical document and aligns the document to a particular pose so that all images are consistent. Module 105c then executes a trained deep embedding and classification model on one or more of the selected, cropped images in order to classify the document against a corpus of known, verified documents. For example, document classification module 105c can be configured to generate one or more embeddings for features of the cropped image and then use the embeddings as input to the deep embedding and classification model, which generates a document classification for the physical document in the image based upon the embeddings. It should be appreciated that the deep embedding and classification model can be pre-trained on the corpus of verified documents and stored on mobile computing device 102 for retrieval and use by SDK 105. In some embodiments, when the deep embedding and classification model is unable to classify the document in a particular image from the selected images, document classification module 105c can select one or more other images from the selected images for embedding and classification until the model returns an assessment value that meets a particular threshold (i.e., a high assessment value meaning that the model has a high degree of confidence that the document depicted in the image(s) is of the same type as a particular known document, and a low assessment value meaning that the model has a low degree of confidence that the depicted document is of the same type as a known document). Exemplary deep learning approaches that can be used by module 105c to classify the document are described in He, Szegedy, Tan, Wang, and Gao, supra (incorporated herein by reference).

After classification is complete, document classification module 105c retrieves configuration parameters and related metadata for the classified document type from, e.g., memory 104b, disk storage 104c and/or template data 110 of server computing device 108. For example, if module 105c determines that the document in the images is a U.S. passport, module 105c can retrieve specific configuration parameters and metadata generated from a known, verified U.S. passport for use in analyzing the images. As can be appreciated, module 105c can utilize a variety of different configuration parameters and metadata, including but not limited to: document material properties, location and arrangement of specific text features on the document, location and arrangement of specific graphical and/or image features on the document, location and arrangement of specific OVD features on the document, relative location of certain features to each other within the document, colors and other visual characteristics of certain features on the document, and so forth. In addition, once module 105c is able to classify the physical document depicted in the image, module 105c can use the configuration metadata to adjust the operational parameters of image capture device 103 in a similar fashion as described above. As an illustrative example, when module 105c classifies the document as a U.S. passport and retrieves the corresponding configuration parameters, module 105c can dynamically adjust operational parameters of image capture device 103 based upon preferred capture settings for U.S. passports that result in optimal signal return for the relevant features of the passport. As a result, subsequent frames of the video are captured using these preferred settings.

As mentioned above, in some embodiments the configuration parameters can include location coordinates for particular features of the document—such as an OVD. Document classification module 105c can reference these location coordinates against the document depicted in the image to identify (step 206) a region of interest in the physical document using the selected images. As used herein, a region of interest is a portion of the physical document that may contain particular feature(s) or characteristic(s) that are relevant to determining whether the physical document is authentic. Exemplary features can include, but are not limited to, OVDs, watermarks, text, pictures, images, formatting, other graphical features, etc. Although the description herein focuses on OVDs, it should be appreciated that other types of regions of interest can be analyzed using the same or similar processing steps. Also, in some embodiments, module 105c can identify a plurality of regions of interest in the physical document—each of which can be separately authenticated and/or relational characteristics between the regions of interest can be analyzed holistically to make an authentication determination.

Once the region of interest is identified in the selected images, module 105d can analyze incoming frames to ensure that a particular range of angles/tilt has been passed through in each axis. As can be appreciated, in order to authenticate a particular region of interest (e.g., OVD) in a document, the system must capture sufficient signal for the OVD so that the entire OVD is visible. For many OVDs, different portions of the OVD are visible and/or change color depending upon the position and angle of the OVD in relation to a light source. In order to understand whether a given physical document is authentic, it is necessary to use information from multiple frames taken at different angles to be able to fully reconstruct the OVD so that the full detail of the OVD is visible in a single view. Therefore, rotation and tilting of the document and/or mobile computing device while taking video of the document is essential in the ADL process to ensure that the OVD is sufficiently captured.

Advantageously, document authentication module 105d can assess multiple frames of the video (either individually and/or in aggregate) to determine whether enough signal information for a particular OVD has been captured throughout the video as the user rotates and tilts the document in view of image capture device 103 and/or rotates and tilts mobile computing device 102. In one example, module 105d may require that the user pass the document or mobile computing device through a specific range of motion (e.g., 5, 10, 20, 25 degrees of tilt in each axis) to have a high likelihood that enough signal information for the OVD has been captured. As mentioned above, in some embodiments, module 105d dynamically determines the range of motion required using factors such as image capture conditions, lighting conditions, number of light sources, operational parameters of image capture device 103, and the like in order to ensure maximization of signal capture while reducing or minimizing the amount of motion required from the user—thereby simplifying the user experience. Certain types of documents may require different ranges of motion, depending on attributes such as size, location of OVD elements, material composition, and the like. If the required angles have not been covered during capture of the video, document authentication module 105d can instruct the user to continue tilting and/or rotating the physical document and/or mobile computing device 102. As can be appreciated, SDK 105 can include processes that generate graphical user interface (GUI) elements to guide the user in tilting and rotating the physical document and/or mobile computing device 102 during the video capture. For example, the GUI elements may display a bounding box as an overlay on top of the video stream to show the user where to place the physical document and/or region of interest so that a sufficient view of region can be captured. In another example, the GUI elements may include directional indicia that instruct the user to tilt or rotate the physical document and/or mobile computing device 102 in specific directions or between specific angles in order to satisfy the capture requirements.

Figure 4A:
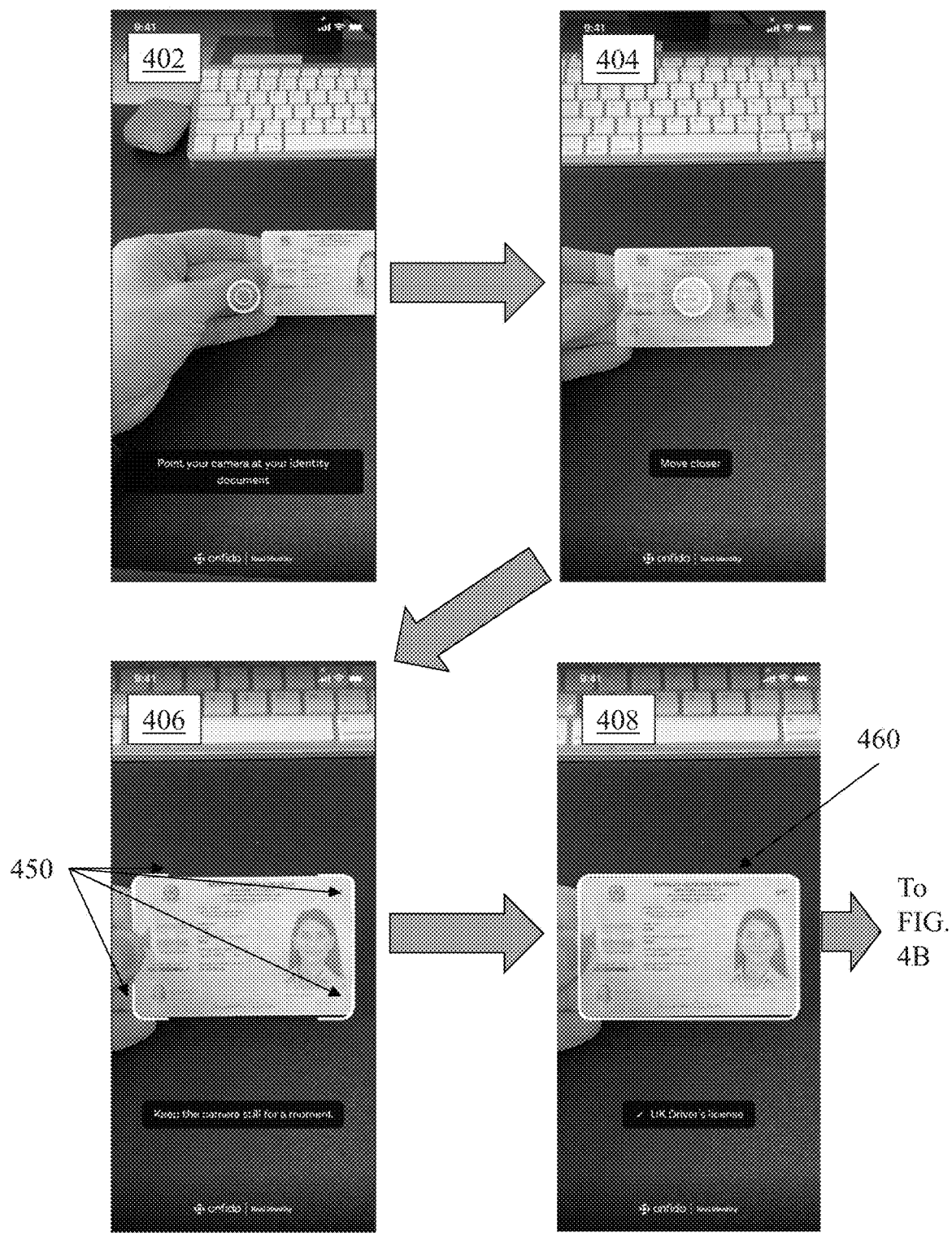
FIGS. 4A and 4B comprise an exemplary user interface workflow for guiding a user in tilting and rotating a document during the Active Document Liveness process.
Figure 4B:
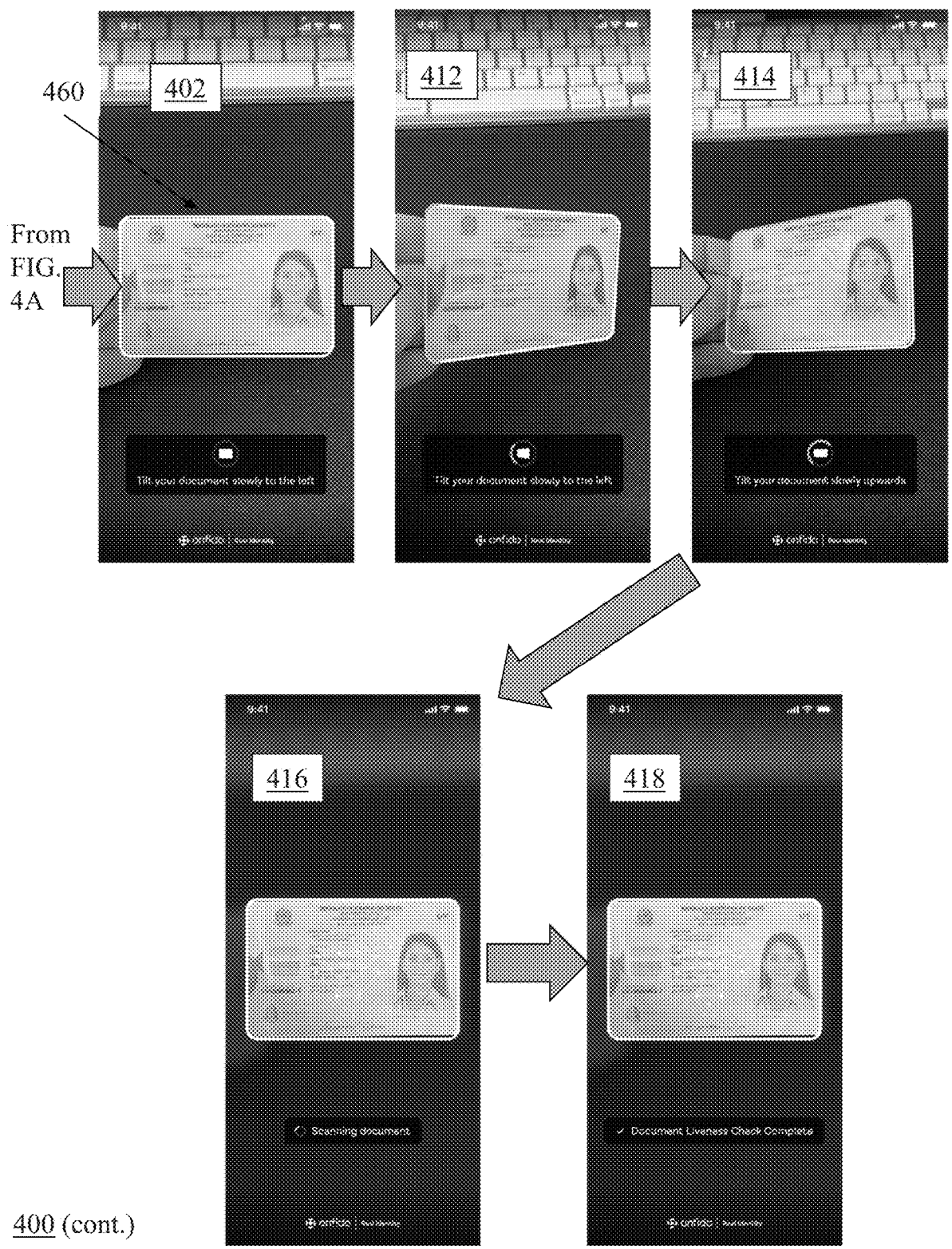

FIGS. 4A and 4B comprise an exemplary user interface workflow 400 for guiding a user in tilting and rotating a document during the Active Document Liveness process. As shown in FIG. 4A, a user of mobile computing device 102 can hold a document (e.g., a driver's license) in front of image capture device 103 (see screen 402) and a user interface of device 102 (implemented by SDK 105) can guide the user to align the document with a user interface element (e.g., a circle) so that the document is fully visible and at a predetermined distance from the image capture device 103 (see screen 404).

The user interface of mobile computing device 102 can then display another user interface element (e.g., bounding lines 450 at the corners of the document and/or a bounding box 460) in the user interface that confirms the document is properly positioned and aligned to the image capture device 103 (see screen 406). The user interface instructs the user to hold the mobile computing device 102 (and/or the document) still for a moment and module 105d performs classification of the document to confirm the document is a U.K. driver's license (see screen 408). Turning to FIG. 4B, the user interface can instruct the user to tilt and/or rotate the document in certain directions (e.g., left, right, upwards, and/or downwards) while image capture device 103 and module 105d capture and process images of the document as described above (see screens 410, 412, 414). In some embodiments, module 105a can enhance user interface in order to provide a visual indicator to user regarding scanning progress and signal capture. For example, one or more sides of the bounding box 460 can change color (e.g., from white to green) as sufficient range(s) of motion on the corresponding side are met. Once module 105d has determined that the user has rotated and/or tilted the document according to a sufficient range of motion and the captured frames are sufficient for document verification, user interface can display indicia to the user that the document is being scanned (see screen 416) and that the document liveness check is complete, indicating the document is authenticated (see screen 418).

In some embodiments, module 105d dynamically assesses the document while image capture device 103 captures frames and/or video, given the ambient lighting conditions, to guide a user through the minimum amount of rotation and/or tilt for a specific document to ensure that sufficient OVD signal is acquired for purposes of document authentication. As an example, for a particular document type (e.g., U.S. passport), the minimum rotation/tilt might be 15 degrees up and 25 degrees to the right. For a different document type (e.g., U.K. driver's license), the minimum rotation/tilt might be 25 degrees up and 10 degrees to the left. Furthermore, the particular lighting conditions can result in module 105*d* dynamically adjusting the minimum rotation/tilt values (as the frames are captured) to ensure that sufficient OVD signal is obtained. For example, in circumstances where ambient light is very bright, a user may only need to rotate a California driver's license 15 degrees to the left (instead of 20 degrees to the left in normal lighting conditions). In another example, the ambient light may be very low and the user may need to rotate a California driver's license 30 degrees to the left in order to obtain sufficient OVD signal. Thus, using a dynamic lighting configuration process, in conjunction with known attributes of the detected document type (as generated from the detection and classification of the document described above), module 105*d* can dynamically adjust the minimum values for rotation/tilt along any axes or in any directions during image capture and processing, so that the user is automatically instructed via a user interface to move the document appropriately to capture sufficient OVD signal. As can be appreciated, the dynamic nature of this process ensures that the full reconstruction is obtained and the maximal amount of signal is elicited for each specific document and document type—in view of the document's characteristics—thus reducing the burden on the user.

Figure 14:
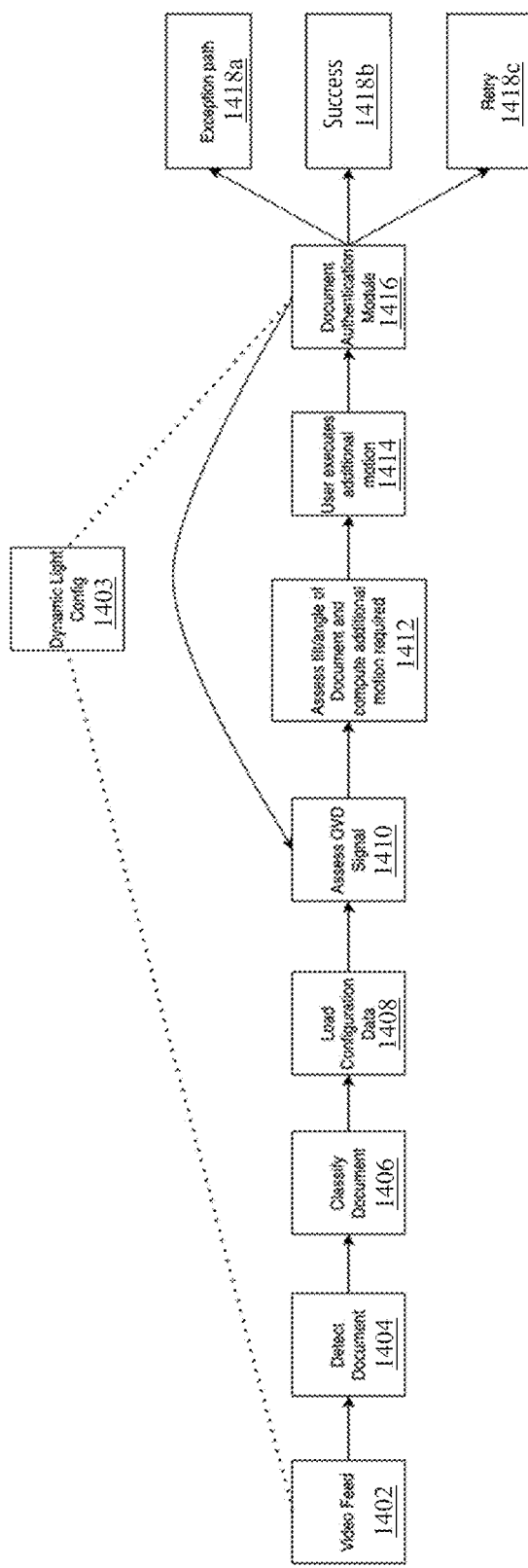
FIG. 14 is a diagram of an exemplary workflow for detecting and classifying a given document, while also dynamically assessing the tilt angle of the document and captured OVD signal, to authenticate the document.

FIG. 14 is a diagram of an exemplary workflow 1400 for detecting and classifying a given document, while also dynamically assessing the tilt angle of the document and captured OVD signal, to authenticate the document using one or more OVDs on the document—using system 100 of FIG. 1. As shown in FIG. 14, as a video feed of the document is captured (1402) by image capture device 103, individual frames of the video feed are analyzed by modules 105*a*-105*d* to detect the document (1404), classify the document (1406), and load configuration data for the classified document type (1408). During each of these steps 1402, 1404, and 1406, modules 105*a*-105*d* can utilize the dynamic lighting configuration process (1403) to adjust operational parameters of image capture device 103 and/or modify properties of the corresponding document detection or document classification algorithms to account for the particular lighting conditions represented in the video feed. Module 105*d* then assesses (1410) OVD signal and assesses (1412) tilt/angle of document to determine whether sufficient OVD signal has been captured and/or the minimum tilt/rotation of the document is achieved—if module 105*d* determines that additional motion of the document is required (i.e., due to insufficient OVD signal and/or minimum tilt/rotation not being achieved), module 105*d* computes additional motion of the document that should be performed by the user and instructs the user to move the document accordingly. The user executes (1414) the additional motion computed by module 105*d* and then module 105*d* analyzes (1416) the OVD signal to determine if authentication can proceed. As shown in FIG. 14, when module 105*d* determines that the OVD signal is incomplete or insufficient, and/or the range of motion performed by the user is not complete, module 105*d* can loop back to assessing the OVD signal while also utilizing the dynamic lighting configuration process (1403) to adjust operational parameters of image capture device 103 and/or SDK 105, or dynamically adjusting the rotation/tilt range(s) for the document, to maximize the OVD signal capture. When the OVD signal is sufficient and the tilt angle of the document is satisfied, module 105*d* analyzes (1416) the OVD signal to determine authenticity of the document. As can be understood, module 105*d* may determine that the document is fraudulent and raise an exception (1418*a*). Another outcome may be that module 105*d* determines the document is authentic (1418*b*). Or, when module 105*d* cannot determine that the document is authentic or cannot obtain sufficient OVD signal to make an authentication determination, module 105*d* can instruct the user to retry (1418*c*) the authentication process. Therefore, the above workflow beneficially improves the efficiency of the OVD signal capture and analysis procedure, and also provides for easier operation of device 102 during the ADL process.

In some embodiments, document authentication module 105*d* executes a deep learning classification model on each incoming frame of the video to determine whether enough signal information has been captured, in conjunction with the dynamic determination of minimum tilt and/or rotation as described above. Exemplary deep learning classification approaches that can be used by module 105*d* to assess whether sufficient holographic signal has been captured are described in T. Zhang et al., "Spatial-Temporal Recurrent Neural Network for Emotion Recognition," arXiv: 1705.0451v1 [cs.CV] 12 May 2017, available at arxiv.org/pdf/1705.04515.pdf, and Y. Dong et al., "A Hybrid Spatial-temporal Deep Learning Architecture for Lane Detection," arXiv:2110.04079 [cs.CV] 14 Oct. 2021, available at arxiv.org/ftp/arxiv/papers/2110/2110.04079.pdf, each of which is incorporated herein by reference. If module 105*d* determines that the captured signal information is not sufficient, module 105*d* can instruct the user of mobile computing device 102 to continue capturing video of the physical document until the signal information is adequate (as described above).

Also, as mentioned previously, in some embodiments document authentication module 105*d* captures a new video (separate from the video used to detect, locate, and classify the document as described above) that relates specifically to the identified region of interest and uses frames from the new video for analyzing signal information as described above. In other embodiments, document authentication module 105*d* can continuously capture and use the same video throughout the entire process, from document location and classification, to region of interest reconstruction and validation.

After document authentication module 105*d* has determined that sufficient signal information for the relevant region of interest has been captured in the video, module 105*d* can align the captured frames that include the region of interest to a common reference template. For example, module 105*d* can use the template data 110 (either from server computing device 108 or stored in memory 104*b* or disk storage 104*c*) to determine a reference pose of the physical document and/or region of interest. Module 105*d* can transform the pose of the region of interest in the captured frames to align to the reference pose so that the region of interest in all frames are in the same pose—which enables efficient and precise reconstruction of the region of interest.

In some embodiments, module 105*d* utilizes a deep learning algorithm or framework on the captured frames to perform the alignment to the reference pose. As one example, module 105*d* can be configured to execute a deep learning alignment pipeline similar to the image processing pipeline described in G. Balakrishnan et al., "VoxelMorph: A Learning Framework for Deformable Medical Image Registration," arXiv:1809.05231v3 [cs.CV] 1 Sep. 2019, available at arxiv.org/pdf/1809.05231.pdf, or as described in I. Rocco et al., "Convolutional neural network architecture for geometric matching," arXiv:1703.05593v2 [cs.CV] 13 Apr. 2017, available at arxiv.org/pdf/1703.05593.pdf, each of which is incorporated herein by reference. Generally, the deep learning alignment pipeline comprises a convolutional neural network (CNN) that receives as input one or more captured frames (f) and one or more reference templates (t). For each frame-template pair (f t), module 105d concatenates f and t into a 2-channel 3D image, then applies a plurality of 3D convolutional layers to capture hierarchical features of the input image pair, used to estimate a feature map ($\phi$) for the input frame using a set of transformation parameters $\theta$. In some embodiments, module 105d can use a ground truth feature map ($\phi'$) that has transformation parameters $\theta'$ to determine a supervised loss value between the sets of transformation parameters $\theta$ and $\theta'$.

Module 105d then uses a spatial transformer to warp f to f∘$\phi$, which enables evaluation of the similarity of f∘$\phi$ and t. An exemplary spatial transformer used by module 105d is described in M. Jadenberg et al., "Spatial Transformer Networks," arXiv:1506.02025v3 [cs.CV] 4 Feb. 2016, available at arxiv.org/pdf/1506.02025.pdf, which is incorporated herein by reference. Generally, the spatial transformer comprises a localization network, a grid generator, and a sampler. The localization network takes the input feature map $\phi$ from the CNN and regresses the transformation parameters $\theta$ to be applied to the feature map. In some embodiments, the localization network is a convolutional network or a fully-connected network, and comprises a final regression layer to produce the transformation parameters $\theta$. The grid generator uses the transformation parameters $\theta$ to transform a set of sampling points of the input feature map into a target grid representation. It should be appreciated that the grid generator can use a number of different transformations (e.g., 2D affine, plane projective transformation, piecewise affine, thin plate spline, etc.). The sampler takes the set of sampling points from the grid generator along with the input feature map $\phi$ to produce a sampled output feature map ($\phi$w) that is warped according to the transformation parameters $\theta$. It should be appreciated that in some embodiments, the spatial transformer can be augmented with an attention mechanism that has the spatial transformation network deliberately focus on certain features of the input document (e.g., region of interest segmentation, bounding boxes, etc.). The attention mechanism has the benefit of making the image processing and transformation more computationally efficient. An exemplary attention mechanism used by module 105d is described in P. H. Seo et al., "Attentive Semantic Alignment with Offset-Aware Correlation Kernels," arXiv: 1808.02128v2 [cs.CV] 26 Oct. 2018, available at arxiv.org/pdf/1808.02128.pdf, which is incorporated herein by reference.

Once the frames are aligned, document authentication module 105d reconstructs (step 208) the region of interest using the aligned frames. In some embodiments, document authentication module 105d applies a robust principal component analysis (PCA) algorithm across the aligned frames to reconstruct the region of interest. As an example, module 105d utilizes a principal component pursuit (PCP) algorithm to reconstruct the region of interest. Exemplary PCP algorithms and techniques that can be used by module 105d to reconstruct the region of interest are described in R. Chen et al., "Video Foreground Detection Algorithm Based on Fast Principal Component Pursuit and Motion Saliency," Comput. Intell. Neurosci. 2019, doi: 10.1155/2019/4769185, published 3 Feb. 2019, available at www.ncbi.nlm.nih.gov/pmc/articles/PMC6378080/, and E. Candés et al., "Robust Principal Component Analysis?," arXiv:0912.3599v1 [cs.IT] 18 Dec. 2009, available at arxiv.org/pdf/0912.3599.pdf, each of which is incorporated herein by reference.

After reconstruction of the region of interest from the aligned frames, document authentication module 105d generates an authentication score (step 210) for the document using the reconstructed region of interest. In some embodiments, module 105d utilizes a keypoint matching approach and in other embodiments, module 105d uses a deep learning classifier on the reconstructed region of interest to generate the authentication score for the document based upon features of one or more known reference documents. It should be appreciated that module 105d can use the keypoint matching approach as an alternative to the deep learning approach or vice versa, and that these approaches are generally independent of each other. Each of these approaches is described in detail in the following sections.

Keypoint Matching

In the keypoint matching approach, module 105d compares (step 210a) the reconstruction of the region of interest to one or more reference templates. As can be appreciated, in some embodiments a reference template comprises a reconstructed OVD that is generated from images of a known authentic document of the same type as the document depicted in the video images. The reference template can be generated in advance and stored either in template data 110 on server computing device or in memory 104b and/or disk storage 104c of mobile computing device 102. Module 105d performs the comparison by generating feature descriptors from keypoints for one or more features in each of (i) the region of interest reconstructed from the captured video and (ii) the region of interest in the reference template, and then matching the respective feature descriptors to confirm whether the region of interest in the video is a match to the authentic region of interest (or not).

FIG. 5 is a flow diagram of a computerized method 500 for feature descriptor generation and keypoint matching, using the system 100 of FIG. 1. Document authentication module 105d detects (step 502a) one or more keypoints of features of the OVD in the reconstructed region of interest from the captured video, and detects (step 502b) one or more keypoints of features of the OVD in the reference template. Generally, a keypoint is a small portion of an image that, for one reason or another, is unusually distinctive and which might be able to be located in another related image. Exemplary keypoints can be determined in regions or areas that contain identifiable features, like edges, corners, curves, shapes, lines, and other unique visual elements. To detect keypoints, document authentication module 105d can utilize any of a number of different feature detection algorithms and approaches—such as: dense feature detection (i.e., calculating simple keypoints on a user-defined grid); GFTT (as described in J. Shi and Tomasi, "Good features to track," 1994 Proceedings of IEEE Conference on Computer Vision and Pattern Recognition, pp. 593-600, doi: 10.1109/CVPR.1994.323794, which is incorporated herein by reference); FAST (as described in E. Rosten and T. Drummond, "Machine learning for high-speed corner detection," Computer Vision—ECCV 2006, Lecture Notes in Computer Science, vol. 3951, pp. 430-443, doi:10.1007/11744023_34, which is incorporated herein by reference); AGAST (E. Mair et al., "Adaptive and generic corner detection based on the accelerated segment test," Computer Vision— ECCV 2010, Lecture Notes in Computer Science, vol. 6312, pp. 183-196, doi:10.1007/978-3-642-15552-9_14, which is incorporated herein by reference); Harris-Laplace (as described in K. Mikolajczyk and C. Schmid, "Scale & Affine Invariant Interest Point Detectors," International Journal of Computer Vision 60(1), pp. 63-86, 2004, which is incorporated herein by reference); StarDetector (as described in M. Agarwal et al., "CenSurE: Center surround extremas for real time feature detection and matching," Computer Vision—ECCV 2008, Lecture Notes in Computer Science, vol. 5305, pp. 102-115, doi: 10.1007/978-3-540-88693-8_8, which is incorporated herein by reference); SIFT (as described in D. G. Lowe, "Distinctive Image Features from Scale-Invariant Keypoints," International Journal of Computer Vision 60, pp. 99-110 (2004), doi: 10.1023/B:VISI.0000029664.99615.94, which is incorporated herein by reference); ORB (as described in E. Rublee et al., "ORB: An efficient alternative to SIFT or SURF," 2011 International Conference on Computer Vision, doi:10.1109/ICCV.2011.6126544, which is incorporated herein by reference); or BRISK (S. Leutenegger et al., "BRISK: Binary Robust invariant scalable keypoints," 2011 International Conference on Computer Vision, pp. 2548-2555, doi: 10.1109/ICCV.2011.6126542, which is incorporated herein by reference).

For each of the keypoints detected in the OVD in the reconstructed region of interest, document authentication module 105d computes (step 504a) a feature descriptor for the corresponding keypoint. Similarly, module 105d computes (step 504b) a feature descriptor for each of the keypoints detected in the OVD in the reference template. Generally, a feature descriptor is a mathematical construction, typically (but not always) a vector of floating-point values, which in some way describes an individual keypoint, and which can be used to determine whether—in some context—two keypoints are "the same." To compute the feature descriptors, document authentication module 105d can utilize any of a number of different feature description algorithms and approaches—such as: AKAZE (as described in as described in P. F. Alcantarilla et al., "Fast explicit diffusion for accelerated features in nonlinear scale spaces," British Machine Vision Conf. (BMVC) 2013, doi: 10.5244/C.27.13, which is incorporated herein by reference), KAZE (as described in P. F. Alcantarilla et al., "Kaze features," Computer Vision—ECCV 2012, Lecture Notes in Computer Science, vol. 7577, pp. 214-227, which is incorporated herein by reference); BRISK (supra); SIFT (supra); ORB (supra); FREAK (as described in R. Ortiz, "Freak: Fast retina keypoint," Proceedings of the 2012 IEEE Conference on Computer Vision and Pattern Recognition (CVPR), pp. 510-517, which is incorporated herein by reference); BRIEF (as described in M. Calonder et al., "Brief: Computing a local binary descriptor very fast," IEEE Transactions on Pattern Analysis and Machine Intelligence, vol. 34, no. 7, pp. 1281-1298 (2011), which is incorporated herein by reference); DAISY (as described in E. Tola et al., "Daisy: An Efficient Dense Descriptor Applied to Wide Baseline Stereo," IEEE Transactions on Pattern Matching and Machine Intelligence, 2010, vol. 32, no. 5, pp. 815-830, doi: 10.1109/TPAMI.2009.77, which is incorporated herein by reference); LATCH (as described in G. Levi and T. Hassner, "Latch: Learned arrangements of three patch codes," 2016 IEEE Winter Conference on Applications of Computer Vision (WACV), 2016, pp. 1-9, which is incorporated herein by reference); or VGG (as described in K. Simonyan and A. Zisserman, "Very deep convolutional networks for large-scale image recognition," arXiv:1409.1556v6 [cs.CV], Apr. 10, 2015, which is incorporated herein by reference).

Once the feature descriptors are computed for each keypoint as described above, document authentication module 105d compares (step 506) feature descriptors for the keypoints in the OVD in the reconstructed region of interest to feature descriptors for the keypoints in the OVD in the reference template. In some embodiments, module 105d performs a simple brute force comparison of every feature descriptor in the reconstructed region of interest to every feature descriptor in the reference template. If the feature descriptors are the same, module 105d determines that the keypoints are a match. If the feature descriptors are not the same, module 105d determines that the keypoints are not a match. Module 105d performs this comparison to identify, e.g., how many keypoints match between the reconstructed region of interest and the reference template.

Based upon the keypoint comparison step, module 105d generates (step 508) an authentication score for the physical document. In some embodiments, module 105d uses a threshold percentage value to generate the authentication score—for example, module 105d can base the authentication score on a particular percentage of keypoints (e.g., 51%) that match between the reconstructed region of interest and the reference template. In some embodiments, module 105d uses a threshold count value to generate the authentication score—for example, module 105d can set the authentication score using the number of matching keypoints that is greater than a defined threshold (e.g., 50, 100, 500, etc.). As can be appreciated, these threshold values and percentages can be adjusted based upon a variety of considerations, including but not limited to document type, region of interest type, and so forth. In addition, in some embodiments the threshold values may be set according to specific security considerations—for example, the authenticity threshold value for a specific application (e.g., validation of a user identification card or passport for air travel) may require a higher number or percentage of keypoint matches than a different application (e.g., validation of a user identification card to make a retail purchase). Also, the threshold can be configured as a range of values—where (i) a number of keypoint matches that falls below a minimum value generates an authentication score that indicates the region of interest and/or document is not authentic, (ii) a number of keypoint matches that exceeds a maximum threshold generates an authentication score that indicates the region of interest and/or document is authentic, and (iii) a number of keypoint matches between the minimum and maximum generates an authentication score that is inconclusive or incomplete, meaning that additional information is needed before an authentication score can be generated and/or an authenticity determination can be made. In these circumstances, module 105d may prompt the user of mobile computing device 102 to, e.g., capture additional video of the physical document to see if an authentication score can be generated, and/or restart the entire authentication process from the beginning.

In some embodiments, due to hardware and/or software limitations, mobile computing device 102 may only be able to execute certain image processing, document classification, keypoint matching, and/or deep learning algorithms. As a result, SDK 105 may be unable to generate an authentication score and/or make a determination of whether a document is authentic or not authentic using the limited set of algorithms. In these situations, mobile computing device module 105d can transmit one or more of the captured frames to server computing device 108 which can have greater processing power, data throughput, and capability to execute more advanced analysis—including a wider range of algorithms. Server computing device 108 can perform further analysis of the frames using, e.g., other algorithms or techniques that cannot be sufficiently executed on mobile computing device 102. Based on this further analysis, server computing device 108 may be able to generate an authentication score and/or make a determination that the physical document is authentic or not authentic, and transmit the authentication score and/or determination back to mobile computing device 102.

In some embodiments, document authentication module 105d can perform one or more additional steps to confirm and/or increase the accuracy of the keypoint matching process by eliminating false positives. In some embodiments, module 105d refines the brute force matching approach described above by implementing a cross-check on the matches—whereby a match between a keypoint of the reconstructed region of interest and a keypoint of the reference template is confirmed only when (i) the feature descriptor of the reconstructed region of interest is the closest neighbor to the matched feature descriptor of the reference template and (ii) the feature descriptor of the reference template is the closest neighbor to the matched feature descriptor of the reconstructed region of interest. This cross-check approach is useful for eliminating false positive matches.

An additional confirmation step performed by document authentication module 105d can be to compare the locations of the matching keypoints using, e.g., the Euclidian distance between each keypoint match, allowing some tolerance that accounts for slight misalignments between the reconstructed region of interest and the reference template. Also, module 105d can adjust the reference template region of interest using a polygon (such as a bounding box). This ensures that keypoints from the reconstructed region of interest are only compared with relevant keypoints in the reference template, and not compared to other keypoints in the reference template which are potentially "correct" (e.g., alphanumeric characters that are the same for all documents of a given type) but could contribute to a false positive match.

Figure 6A:
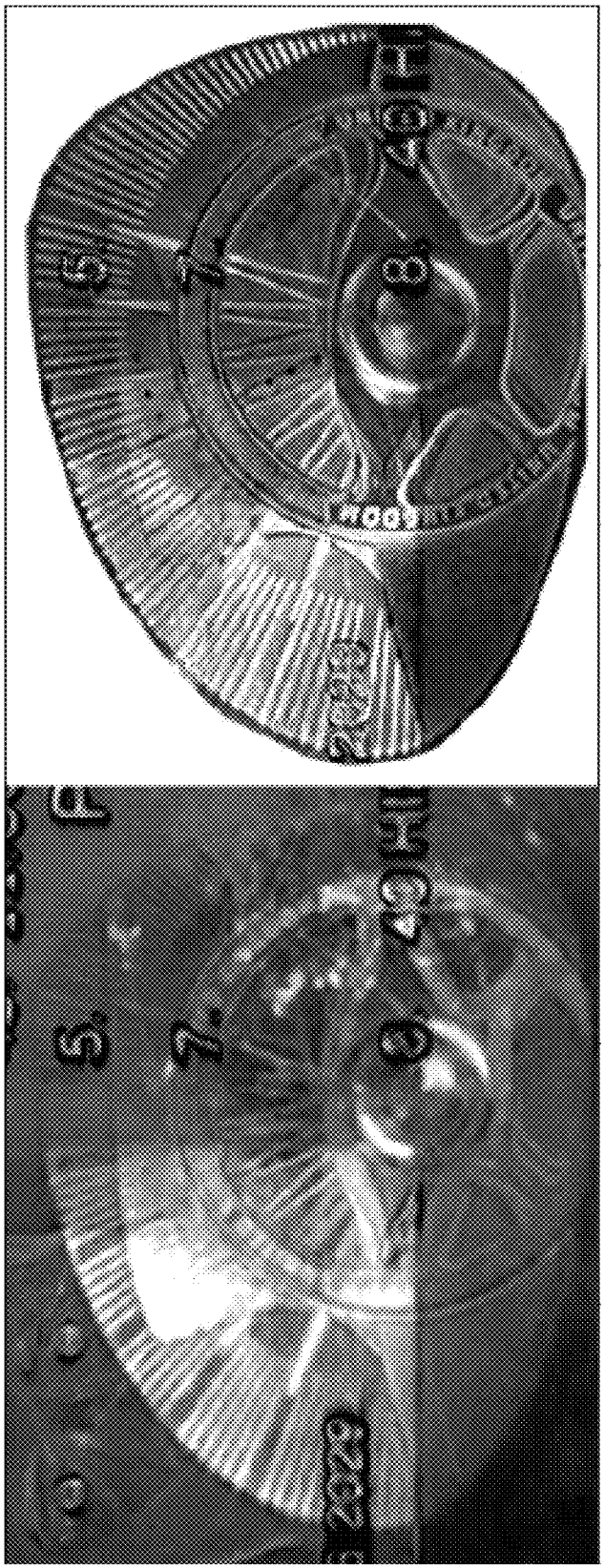
FIGS. 6A and 6B are diagrams for an exemplary keypoint matching result for an authentic document as generated by document authentication module.
Figure 6B:

FIGS. 6A and 6B are diagrams for an exemplary keypoint matching result for an authentic document as generated by document authentication module 105d. As shown in FIG. 6A, the image 602 on the left is the reconstructed region of interest (e.g., OVD) from a physical document presented for authentication and captured in video using the techniques described above. The image 604 on the right is the region of interest reconstructed from the reference template for the same physical document type. As can be appreciated, the regions of interest in the respective images 602, 604 exhibit many of the same visual characteristics—such as the circular symbol in the lower-right corner of each image, the curved shape in the upper-left corner, and so forth. FIG. 6B shows the two images 602, 604 after keypoint matching has been performed by module 105d—the lines 606 connecting keypoints between the two images represent a confirmed match between those corresponding keypoints. As shown in FIG. 6B, there are a significant number of keypoint matches, indicating a high degree of confidence that the region of interest in the physical document captured on video is authentic.

Figure 7A:
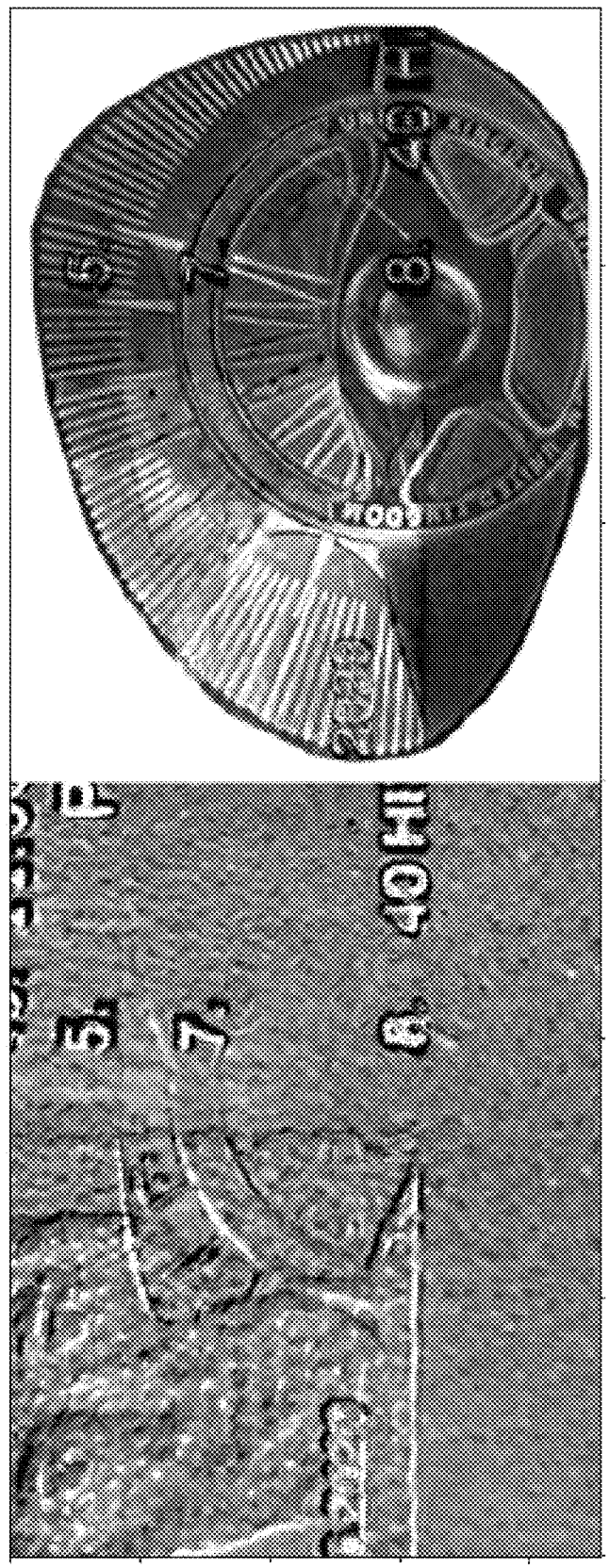
FIGS. 7A and 7B are diagrams for an exemplary keypoint matching result for a fake document as generated by document authentication module.
Figure 7B:
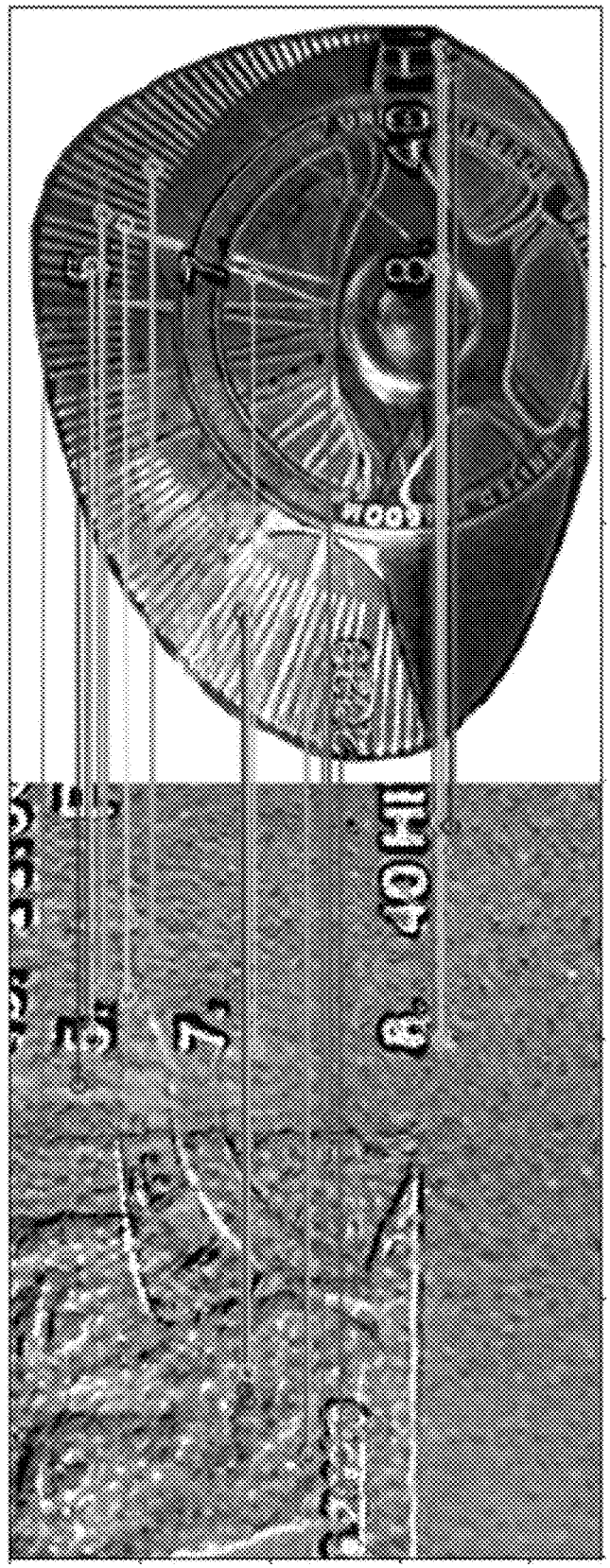

FIGS. 7A and 7B are diagrams for an exemplary keypoint matching result for a fake document as generated by document authentication module 105d. As shown in FIG. 7A, the image 702 on the left is the reconstructed region of interest (e.g., OVD) from a physical document presented for authentication and captured in video using the techniques described above. The image 704 on the right is the region of interest reconstructed from the reference template for the same physical document type. As can be appreciated, the regions of interest in the respective images 702, 704 exhibit some similar visual characteristics—such as numerals 5, 7, 8, 40, and 2020 in specific positions and a portion of the circular symbol—but there are also significant visual differences between the two images. FIG. 7B shows the two images 702, 704 after keypoint matching has been performed by module 105d—the lines 706 connecting keypoints between the two images represent a confirmed match between those corresponding keypoints. As shown in FIG. 7B, there are a very small number of keypoint matches, indicating a low degree of confidence that the region of interest in the physical document captured on video is authentic.

In some embodiments, document authentication module 105d can stop the keypoint matching process before comparing all sets of keypoints upon reaching a desired number or percentage of keypoint matches. For example, if the threshold percentage for a particular region of interest is 60%, module 105d can be configured to end the process of matching keypoints as soon as the percentage of keypoint matches reaches or exceeds 60%—thereby generating an authentication score using the processed information. Alternatively, if module 105d has analyzed a certain percentage (e.g., over 75%) of the keypoint pairs and found that the number of keypoint matches falls well below the required threshold, it could indicate that it is highly unlikely or impossible that the remaining unanalyzed keypoint pairs would be enough to meet the threshold. In this case, module 105d can stop the keypoint pair analysis and generate an authentication score using the processed information. Using these techniques, module 105d can perform the matching and authentication score generation process more efficiently which results in a faster authenticity determination, along with having a high degree of confidence that its authenticity determination is correct.

Deep Learning Document Classification

As mentioned above, in addition to or instead of the keypoint matching approach, module 105d can utilize a deep learning classification approach to generate the authentication score and confirm whether the document in the images captured by mobile computing device 102 are authentic. In the deep learning classification approach, module 105d executes (step 210b) a trained classification model using one or more features of the reconstruction of the region of interest as input to generate a classification value (or predictive classification value) associated with the region of interest and/or the document. As can be appreciated, in some embodiments the classification value comprises at least one of a probability that the document is authentic, a confidence score that indicates whether the document is authentic, or a similarity metric that indicates whether the document is authentic. In some embodiments, module 105d may use deep embeddings with a classifier or a deep ensemble classifier with uncertainty metrics for document-specific OVD classification. For the approach using deep embeddings with a classifier, module 105d can employ algorithms and techniques described in the following publications: (i) K. He et al., "Deep Residual Learning for Image Recognition," arXiv:1512.03385v1 [cs.CV] 10 Dec. 2015, available at arxiv.org/pdf/1512.03385v1.pdf; (ii) C. Szegedy et al., "Rethinking the Inception Architecture for Computer Vision," arXiv:1500567v3 [cs.CV] 11 Dec. 2015, available at arxiv.org/pdf/1512.00567v3.pdf; (iii) M. Tan & Q.V. Lee, "EfficientNet: Rethinking Model Scaling for Convolutional Neural Networks," "arXiv:1905.11946v5 [cs.LG] 11 Sep. 2020, available at arxiv.org/pdf/1905.11946.pdf; and (iv) C. Wang et al., "EfficientNet-eLite: Extremely Lightweight and Efficient CNN Models for Edge Devices by Network Candidate Search," arXiv:2009.07409v1 [cs.CV] 16 Sep. 2020, available at arxiv.org/pdf/2009.07409v1.pdf. Each of the above publications is incorporated herein by reference.

For the approach using a deep ensemble classifier, module 105*d* can employ algorithms and techniques described in the following publications: (i) B. Lakshminarayanan et al., "Simple and Scalable Predictive Uncertainty Estimation using Deep Ensembles," arXiv:1612.01474v3 [stat.ML] 4 Nov. 2017, available at arxiv.org/pdf/1612.01474v3.pdf, and (ii) R. Rahaman & A. H. Thiery, "Uncertainty Quantification and Deep Ensembles," arXiv:2007.08792v4 [stat.ML] 2 Nov. 2021, available at arxiv.org/pdf/2007.08792.pdf, each of which is incorporated herein by reference.

Furthermore, in some embodiments module 105*d* can utilize one or more interpretable methods to validate the classification value. In some embodiments, the one or more interpretable methods comprise occlusion of at least a portion of the document, perturbation of at least a portion of the document, or analysis of a heatmap of at least a portion of the document. Advantageously, module 105*d* can generate an output using the one or more interpretable methods described above that comprises an identification of the reconstructed region of interest that represents proof of the document being genuine or fraudulent. Exemplary interpretability techniques that can be adopted include, but are not limited to, one or more of: occlusion analysis, sensitivity analysis, class activation map (CAM), gradient-weighted class activation map (Grad-CAM) (as described in R. Selvaraju et al., "Grad-CAM: Visual Explanations from Deep Networks via Gradient-based Localization," arXiv: 1610.02391 [cs.CV] 3 Dec. 2019, available at arxiv.org/pdf/1610.02391.pdf, which is incorporated herein by reference), layer-wise relevance propagation (LRP) (as described in G. Montavon et al., "Layer-Wise Relevance Propagation: An Overview," Explainable AI: Interpreting, Explaining and Visualizing Deep Learning, Lecture Notes in Computer Science, vol. 11700, pp. 193-209, 10 Sep. 2019, Springer, which is incorporated herein by reference), integrated gradient (as described in M. Sundararajan et al., "Axiomatic Attribution for Deep Networks," arXiv:1703.01365v2 [cs.LG] 13 Jun. 2017, available at arxiv.org/pdf/1703.01365.pdf, which is incorporated herein by reference) and PatternNetAttribution (as described in P. Kindermans et al., "Learning How to Explain Neural Networks: PatternNet and PatternAttribution," arXiv:1705.05598v2 [stat.ML] 24 Oct. 2017, available at arxiv.org/pdf/1705.05598.pdf, which is incorporated herein by reference). A detailed overview of the interpretability of deep learning techniques is described in W. Lim et al, "The adoption of deep learning interpretability techniques on diabetic retinopathy analysis: a review," Medical & Biological Engineering & Computing 60, 633-642 (2022), which is incorporated herein by reference. There is not much debate about the interpretability of these CNN models: where did the networks look for discriminative characteristics when creating an authentication score? While classification accuracy is critical in automated authentication activities, understanding the reasoning behind the computer-assisted conclusion has become increasingly important and valued both in a governance context but also to investigate and ensure performance is in line with expectation. Adopting such techniques can aid in outlier detection, understanding and building confidence in a model's performance and rational for their behavior as well as building trust for developers, regulators and users of AI models. Further details regarding the visualization of image classification models are provided in the following references: (i) K. Simonyan et al., "Deep Inside Convolutional Networks: Visualising Image Classification Models and Saliency Maps," arXiv:1312.6034v2 [cs.CV] 19 Apr. 2014, available at arxiv.org/pdf/1312.6034.pdf; (ii) M. Zeiler and R. Fergus, "Visualizing and Understanding Convolutional Networks," Computer Vision— ECCV 2014, Lecture Notes in Computer Science, vol. 8689, pp. 818-833, Springer, doi.org/10.1007/978-3-319-10590-1_53; each of which is incorporated herein by reference. By using the methods for active and passive document liveness, the system is able to authenticate the presence and right behavior of the OVD elements in the document. Therefore, the output of these methods can prove the presence of genuine OVD elements or not in a document. This can be presented as a series of images where the characteristics and location of the OVD elements are explicitly extracted and presented as evidence (e.g., on a display device, for example, to a security agent or other authority tasked with confirming the authenticity of documents).

It should be appreciated that the deep embeddings with classifier and deep ensemble classifier each provides the advantage of scalability and robustness to noise over the simple keypoint matching approach. For example, a typical keypoint matching approach can be applied in a one-to-one document to template ratio, while a deep learning classification approach is scalable to populations of templates or documents—making it more efficient, effective, and robust. An exemplary deep ensemble template matching approach that can be used by module 105*d* is described in B. Gao and M. Spratling, "Robust Template Matching via Hierarchical Convolutional Features from a Shape Biased CNN," arXiv: 2007.15817v3 [cs.CV] 7 May 2021, available at arxiv.org/pdf/2007.15817.pdf, which is incorporated herein by reference. The classification value generated by the model can be used by module 105*d* as the authentication score. For example, in one embodiment the model can generate a classification value between 0 and 1 for the document and/or region of interest. In this embodiment, a classification value that falls closer to 0 may indicate the document is not authentic, while a classification value that falls closer to 1 may indicate that the document is authentic.

Turning back to FIG. 2, after document authentication module 105*d* has conducted the keypoint matching process and/or the deep learning classification process described above to generate the authentication score, module 105*d* determines (step 212) whether the physical document is authentic based upon the generated authentication score. For the keypoint matching approach, module 105*d* utilizes the authentication score generated from the comparison between the reconstructed region of interest and the reference template in order to make a determination of whether the document is authentic. As explained previously, in some embodiments module 105*d* can determine that a physical document is authentic or not authentic based upon a number and/or a percentage of keypoint matches between the reconstructed region of interest and the reference template. For the deep learning classification approach, module 105*d* can analyze one or more classification values returned by the deep learning classification model as authentication score(s) and analyze the score(s) (e.g., comparing the returned classification value to one or more threshold values) in order to determine whether the document is authentic—for example, when the model returns a classification value for the document that is at or above a certain threshold value, module 105*d* can determine that the document is authentic. When the classification value is below the threshold value, module 105*d* can determine that the document is not authentic. It should be appreciated that the above evaluations are merely exemplary and other methodologies for determining whether a document is authentic can be used within the scope of the technology described herein.

Figure 15:
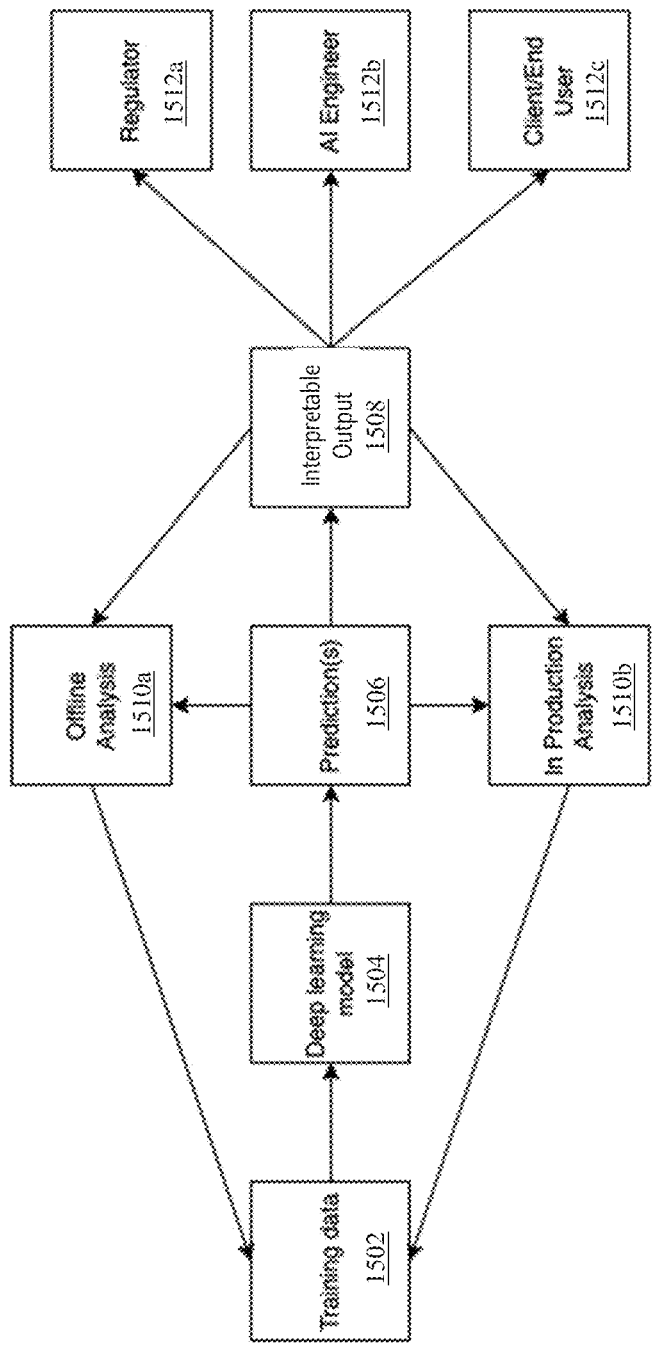
FIG. 15 is a diagram of an exemplary workflow 1500 for generating interpretable output of a deep learning document authentication determination.

FIG. 15 is a diagram of an exemplary workflow 1500 for generating interpretable output of a deep learning document authentication determination—using system 100 of FIG. 1. As shown in FIG. 15, training data (1502) is passed as input to the deep learning model (1504) which generates one or more predictions of a document's authenticity (1506) using the techniques described above. The prediction(s) generated by the model are converted into an interpretable output (e.g., visual representations of the authentication decision, such as those using the interpretable methods described herein). The interpretable output is provided to one or more appropriate recipients, such as a regulator (1512a) for confirming compliance of the deep learning techniques in making proper authentication determinations, an AI engineer (1512b) for assessment in the performance of the deep learning processes and authentication determinations, or a client/end user (1512c) such as a security agent for determining authenticity of documents. As can be appreciated, in some embodiments, the prediction(s) and/or the interpretable output are used for offline analysis (1510a) and/or in-production analysis (1510b) which is then used to update and/or augment the training data for future model training.

As mentioned above, in certain circumstances document authentication module 105d may be unable to make a determination of whether a given physical document is authentic or not. For example, portions of the physical document that comprise the region of interest may be partially occluded during video capture or the resulting images are blurry or noisy. When the region of interest is subsequently reconstructed by module 105d, the reconstructed region of interest may retain aspects of the above-identified deficiencies that impact the keypoint matching process and/or the deep learning classification process. For example, in the keypoint matching process, module 105d may be able to identify a particular number of keypoint matches for unoccluded areas of the region of interest, but due to occlusion, that number of keypoint matches does not meet the required threshold. For example, in the deep learning classification process, module 105d may not be able to generate sufficient features for the region of interest in order to execute the classification model and/or have the model return a classification value that is within an acceptable error value. In these situations, the user of mobile computing device 102 may ask for additional documentation and/or restart the authentication process described above.

When document authentication module 105d makes a determination of whether the physical document captured in the video is authentic or not authentic, module 105d can generate a corresponding notification for presentation to a user of mobile computing device 102. For example, mobile computing device 105d can be configured to generate a visual notification and/or audible notification—such as color-coded indicia displayed on a screen of mobile computing device 102 (e.g., green indicates authentic, red indicates not authentic, yellow indicates unable to determine), different audio tones emitted by mobile computing device 102 (e.g., a first tone indicates authentic, a second tone indicates not authentic, a third tone indicates unable to determine). In some embodiments, when mobile computing device 102 is unable to determine authenticity, device 102 can request that the user perform manual inspection of the document (e.g., using his or her judgment and experience to determine authenticity) and/or prompt the user to re-start the image capture and authentication process so that additional and/or improved images can be captured.

Passive Document Liveness

As mentioned above, the systems and methods described herein can also utilize a Passive Document Liveness (PDL) methodology instead of, or in addition to, the ADL methodology in order to evaluate physical documents for authentication purposes. The following section describes the PDL process as performed by system 100 of FIG. 1.

Figure 8:
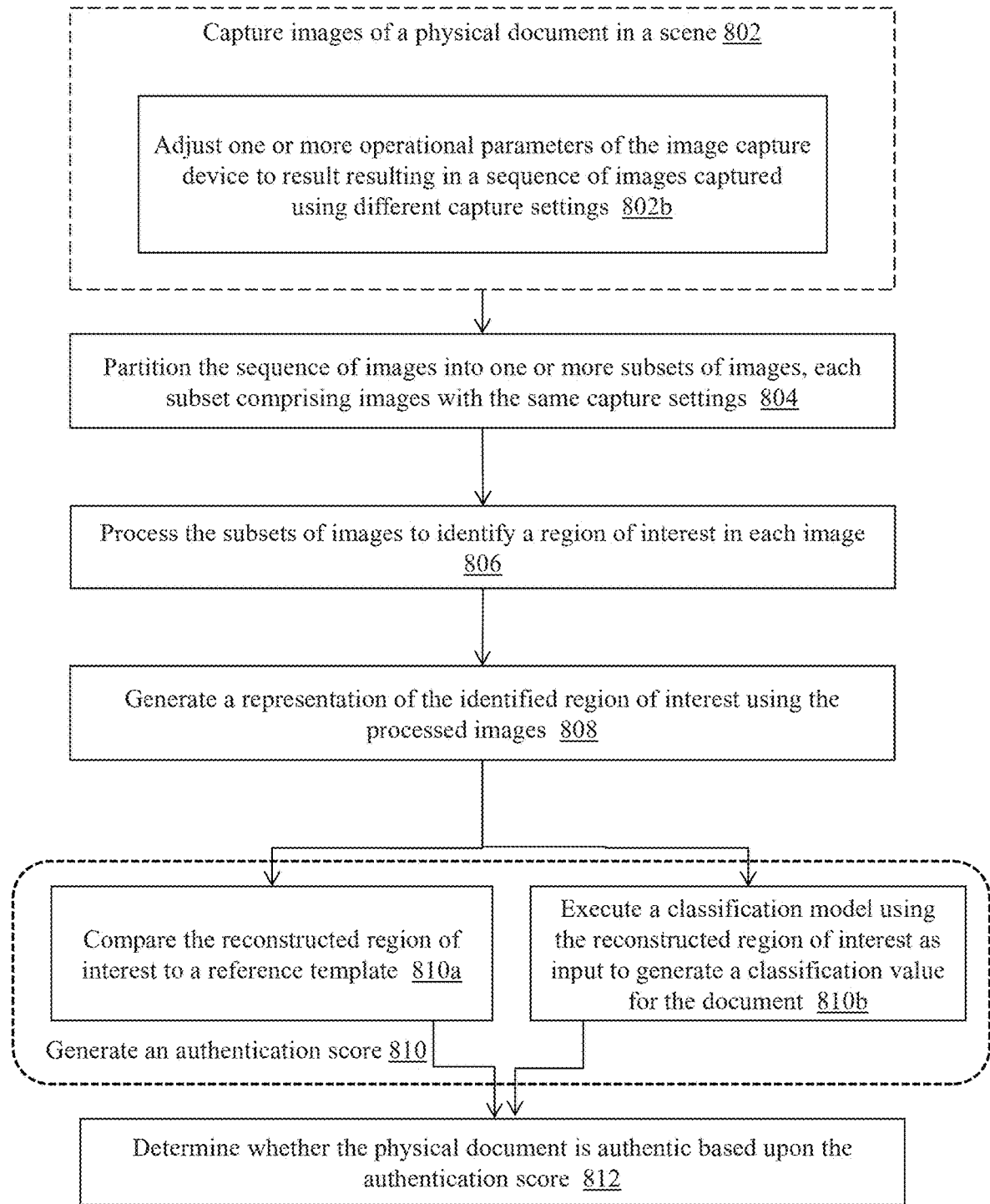
FIG. 8 is a flow diagram of a computerized method of authentication of a physical document using a Passive Document Liveness process where the physical document remains stationary and one or more of lighting conditions and/or capture settings of image capture device are adjusted during image capture.

FIG. 8 is a flow diagram of a computerized method 800 of authentication of a physical document through a Passive Document Liveness process where the physical document remains stationary and one or more of lighting conditions and/or capture settings of image capture device 103 are adjusted, using the system 100 of FIG. 1. As mentioned above, an exemplary PDL process can be where a human user (e.g., security agent) operating mobile computing device 102 can hold the physical document in view of image capture device 103, or place the physical document on a fixed surface in view of image capture device 103, so that the front side and/or back side of the physical document is parallel to image capture device 103. The user can then instruct mobile computing device 102 to capture a video comprising a sequence of frames of the physical document. During capture of the video, in some embodiments the physical document and mobile computing device 102 each remains stationary relative to each other, while certain operational elements of image capture device 103 (e.g., flash, exposure, focus, white balance, gain and offset, etc.) are dynamically adjusted after each image capture using a feedback loop, so that different frames of the video capture the physical document under a variety of lighting conditions and capture conditions (e.g., exposure, aperture, gain, etc.).

A user operates mobile computing device 102 to capture images of a physical document in a scene. As can be appreciated, in some embodiments, the images comprise a video stream or video file with a sequence of images (also called frames). In some embodiments, the video must be of a minimum length or duration (e.g., 5, 10, 15, 20 seconds or another length) and with a minimum frames-per-second value (e.g., 30, 45, 60 FPS or another FPS). As mentioned above, however, embodiments, techniques, algorithms and examples are provided throughout this specification which refer to capture and analysis of a video stream or video file; however, these embodiments, techniques, algorithms and examples are equally applicable to a sequence of individual images. As the frames are captured by image capture device 103, processor 104a transmits the frames to SDK 105 for analysis and processing.

In some embodiments, modules 105a-105c of SDK process the incoming frames in the same way as described above with respect to the ADL methodology. For example, document detection and tracking module 105a detects whether a document is in view of image capture device 103, identifies a location of the physical document in one or more frames, and tracks the document throughout the sequence of frames in the video (see above); document detection and tracking module 105a assesses lighting conditions and physical properties (see above); image preprocessing module 105b analyzes image quality metrics and discards frames that do not satisfy particular requirements (see above); and document classification module 105c classifies the physical document in the frames and retrieves configuration parameters that are used to reconstruct the region of interest (see above). Those sections are not repeated again here. It should be appreciated that, in some embodiments, SDK 105 performs these processing steps prior to capturing video where operational elements of image capture device 103 are dynamically adjusted—so that the document can be located, tracked and classified before reconstructing the region of interest using a different video with the varying capture settings described herein. In other embodiments, SDK 105 performs these processing steps using the video captured using the varying capture settings.

Figure 9:
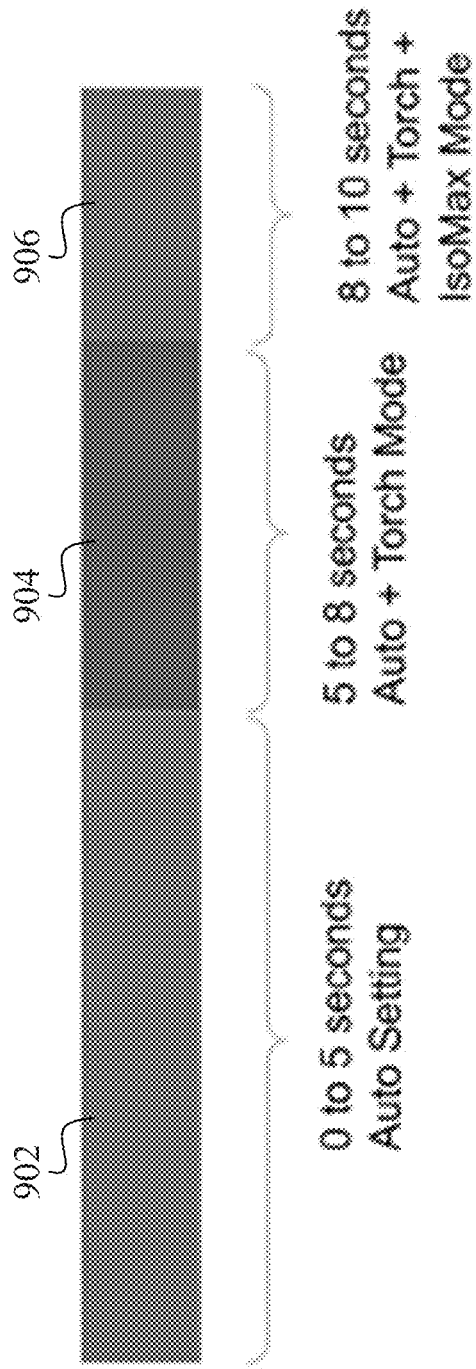
FIG. 9 is an exemplary video capture flow used during in the method of FIG. 8.

Once the physical document is detected, located, tracked, and classified from the video images as described above, SDK 105 instructs image capture device 103 to capture (step 802) images of the physical document during which SDK 105 adjusts (step 802*a*) one or more operational parameters of image capture device 103—which results in different frames of the video having different capture settings including but not limited to: gain settings, offset, exposure settings, focus values, aperture values, lighting changes, flash intensity, and so forth. FIG. 9 is an exemplary video capture flow used by SDK 105 during the PDL process. Image capture device 103 records a video of predetermined length (e.g., 10 seconds) and adjusts the operational parameters at specific intervals during the video capture. For example, from 0 to 5 seconds (reference 902), image capture device 103 records video of the physical document using only the Auto setting. As can be understood, most mobile device cameras include an Auto setting for recording images and video, in which the device automatically sets certain image capture parameters like shutter speed, aperture, focus, and ISO so the user can simply point and shoot.

SDK 105 can then dynamically enable flashlight mode (also referred to as torch mode) for a lighting element of image capture device 103 for frames captured from 5 to 8 seconds (reference 904)—so that the frames are captured using Auto+Torch mode. In this example, flashlight mode means that the flash element of image capture device 103 is activated to a predetermined brightness level (e.g., maximum brightness or another brightness) and remains on at the specified brightness level during capture of the frames.

Then, at 8 to 10 seconds (reference 906), SDK 105 automatically activates an IsoMax mode of image capture device 103—meaning that the ISO setting of image capture device 103 is set to its maximum value, resulting in images that have a high light sensitivity. In some embodiments, the ISO setting is increased to 6400 or higher in IsoMax mode. Therefore, during 8 to 10 seconds of the video, the frames are captured using Auto+Torch+IsoMax mode.

It should be appreciated that the video capture flow of FIG. 9 is merely exemplary, and that other types of video capture flows, video lengths, operational parameter adjustments, and adjustment sequences for image capture device 103 can be used without departing from the scope of the technology described herein. And, as mentioned above, the video capture process is passive for the user because the physical document remains stationary, while mobile computing device 102 adjusts one or more operational parameters of image capture device 103, resulting in a sequence of images captured from a single perspective (e.g., in a flat plane without any three-dimensional rotation or tilting) but using varying capture settings (e.g., lighting, aperture, focus, exposure, gain, etc.).

Also, during the image capture process, SDK 105 can assess background illumination and configure image capture settings for image capture device 103 to a baseline. Then, SDK 105 can cycle through various image capture settings in order to record frames across a variety of capture settings to maximize the likelihood of recording a delta between the baseline and a responsive signal from one or more regions of interest on the physical document. For example, SDK 105 can assess background illumination and determine that ambient light is too bright. Accordingly, SDK 105 can modify the image capture settings to reduce exposure setting and gain. In another example, SDK 105 can determine that conditions are too dark. Accordingly, SDK 105 can modify image capture settings to capture frames using increasing flash intensity and/or increase exposure settings of image capture device 103. In another example, SDK 105 can determine that there is moderate or significant glare on at least a portion of the document. Accordingly, SDK 105 can reduce exposure settings and/or reduce gain to account for the glare. As described previously, SDK 105 can utilize any of a number of different approaches to determine operational capture settings for image capture device 103, such as 1) a rule-based approach; 2) a machine learning model trained on a labelled data set; and/or 3) an end-to-end regression model trained on data.

Once the frames are captured using the different exposure settings, document authentication module 105*d* uses the captured frames to generate a response (reflection) layer for the physical document that exhibits a response signal for one or more regions of interest (e.g., OVDs) on the document. It should be appreciated that, in some embodiments, module 105*d* can execute a deep learning classifier (as described in Zhang and Dong, supra) to assess whether sufficient holographic signal has been captured. In some embodiments, module 105*d* can assess an angle of the physical document in the images against angles of document(s) in a corpus of reference images and recommend to the user to tilt the document to an angle that is more favorable to producing sufficient signal information for authentication. If module 105*d* determines that the captured signal information is not sufficient, module 105*d* can instruct the user of mobile computing device 102 to continue capturing video of the physical document (e.g., using the same and/or different lighting conditions) until the signal information is adequate.

In some embodiments, module 105*d* can register the captured images. Image registration generally refers to the process of aligning two or more images of the same scene, where one image is designated as a reference image (or fixed image) and geometric transformations or local displacements are applied to the other images so that those images align with the designated reference image. As can be appreciated, in some embodiments the user of mobile computing device 102 may imperceptibly or slightly move the device during video capture so that the frames are not exactly aligned with each other. The registration process ensures that the frames of the video are aligned before continuing with generation of the response layer. In some embodiments, the alignment process in PDL mirrors that of the alignment process in ADL (as described above). For example, module 105*d* can align the captured frames that include the region of interest to a common reference template. Module 105*d* can use the template data 110 (either from server computing device 108 or stored in memory 104*b* or disk storage 104*c*) to determine a reference pose of the physical document and/or region of interest. Module 105*d* can transform the pose of the region of interest in the captured frames to align to the reference pose so that the region of interest in all frames are in the same pose—which enables efficient and precise reconstruction of the region of interest. In some embodiments, module 105*d* utilizes a deep learning algorithm or framework on the captured frames to perform the alignment to the reference template. As one example, module 105*d* can be configured to execute a deep learning alignment pipeline similar to the image processing pipeline described in G. Balakrishnan et al., supra.

Turning back to FIG. 8, document authentication module 105*d* partitions (step 804) the aligned sequence of images into one or more subsets of images, where each subset comprises images captured using the same capture settings (e.g., exposure, flash, aperture, white balance, gain, etc.). Using the above example, module 105*d* partitions the video into three subsets of frames: the first subset containing images taken using only Auto mode, the second subset containing frames taken using Auto+Torch mode, and the third subset containing frames taken using Auto+Torch+IsoMax mode.

Next, document authentication module 105*d* processes (step 806) the subsets of images to identify a region of interest in each image (or in some cases, from a representative image from each subset of images). In some embodiments, module 105*d* (alone or in concert with image pre-processing module 105*b*) can perform certain processing steps prior to processing the subsets of images—including but not limited to: performing a basic video quality check to confirm attributes such as video length, frames per second, resolution, and the like meet or exceed minimum values (and/or fall below maximum values) that are considered adequate.

In some embodiments, module 105*d* can analyze image quality metrics of the frames at a temporal level, at a global quality level, at a local quality level, or any combination thereof. As described previously, temporal quality metrics can include, but are not limited to, jitter, motion measurement, etc. Global image quality metrics relate to quality characteristics of the image as a whole and can include, but are not limited to, glare, blur, resolution, and the like. Local image quality metrics relate to quality characteristics of certain portions of the image and can include, but are not limited to, low-level blur, low-level sharpness, text region confidence, character confidence, edge detection, and the like. In some embodiments, module 105*d* can determine a location of one or more regions of interest in the image (e.g., to avoid selection of images where the regions of interest are missing, occluded, or not sufficiently visible). For example, module 105*d* can use the configuration parameters for the document classification to locate the region of interest in the image.

FIG. 10 is a diagram of exemplary candidate images selected by document authentication module 105*d*. As shown in FIG. 10, image 1002 is an example of a frame selected from a first subset of frames, where no flash was activated by mobile computing device 102 during recording. Image 1004 is an example of a frame selected from another subset of frames, where a flash was active at high intensity during recording. As can be seen, image 1004 includes a reflection 1006 of an OVD (which is responding to the brightness of the flash) that is not seen in image 1002. It should be appreciated that, in some embodiments, module 105*d* can analyze all captured images in each subset, a portion of the captured images in each subset, or a candidate image from each subset.

For example, when the subsets of images have been processed, document authentication module 105*d* generates (step 808) a representation of the identified region of interest using the processed images. Document authentication module 105*d* can use the document classification and corresponding configuration parameters to locate the specific region(s) of interest in the document. As explained previously, document classification module 105*c* can process the response layer to classify the document as a particular document type, then retrieve configuration parameters and other metadata for the document type that can be used to identify the region of interest.

Figure 12:
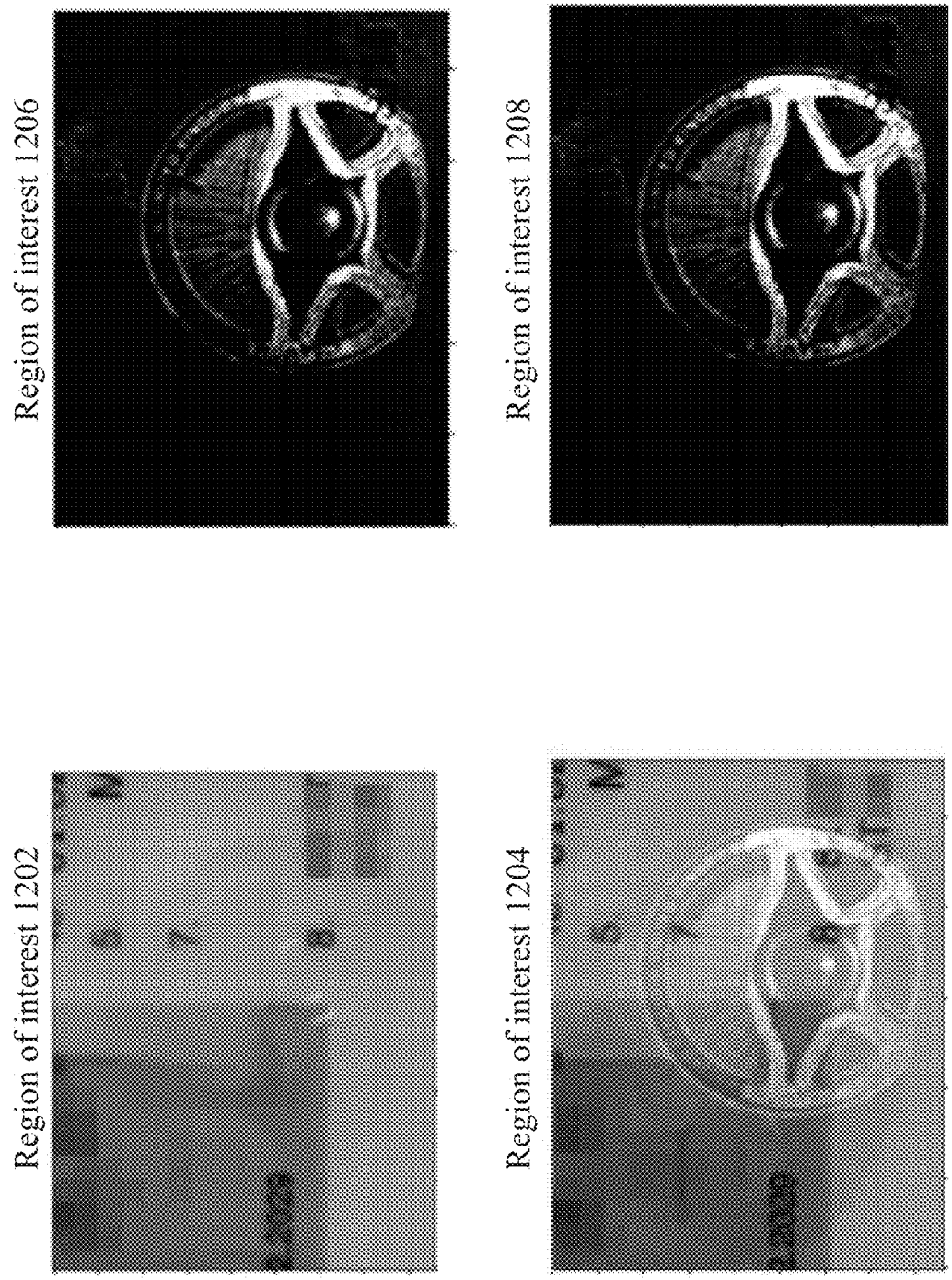
FIG. 12 is a diagram of exemplary cropped areas of candidate images and response layers that isolate regions of interest based upon a reference template as generated by document authentication module.

As in the Active Document Liveness approach described previously, the Passive Document Liveness approach can identify the region of interest using either a reference template or one or more machine learning classification models (e.g., deep learning models, Random Forest algorithms, Support Vector Machines, neural networks, or ensembles thereof). In some embodiments, module 105*d* retrieves a reference template for the document type from, e.g., memory 104*b*, disk storage 104*c* or template data 110 of server computing device 108. The reference template can include labels for one or more regions of interest (i.e., OVDs) in the document that enable module 105*d* to quickly locate those regions. Module 105*d* can project the reference template onto the computed response layer and the labels (such as bounding boxes) corresponding to regions of interest can be used to crop the candidate images to isolate the regions of interest. In some embodiments, after classification, module 105*d* performs a normalization routine to amplify the signal generated by OVDs and to remove or minimize the background signal of the document. FIG. 11 is a diagram of exemplary normalized images as generated by document authentication module 105*d* from the candidate images selected previously. As shown in FIG. 11, normalized image 1102 comprises the normalized subtraction of image 1002 in FIG. 10 from image 1004 in FIG. 10, while normalized image 1104 comprises the normalized subtraction of image 1004 from image 1002. Each normalized image 1102, 1104 comprises a distinctly visible OVD (e.g., 1106) while the remainder of the document in each image is dark. FIG. 12 is a diagram of exemplary cropped areas of the candidate images and the response layer that isolate regions of interest based upon a reference template, as generated by document authentication module 105*d*. As shown in FIG. 12, region of interest 1202 corresponds to image 1002 of FIG. 10 (no flash); region of interest 1204 corresponds to image 1004 of FIG. 10 (with flash); region of interest 1206 corresponds to normalized image 1102 of FIG. 11; and region of interest 1208 corresponds to normalized image 1104 of FIG. 11.

As mentioned above with respect to the ADL process, generation of the representation of the region of interest can be performed by document authentication module 105*d* via applying a robust principal component analysis (PCA) algorithm across the selected frames to reconstruct the region of interest. As an example, module 105*d* can utilize a principal component pursuit (PCP) algorithm to reconstruct the region of interest. Exemplary PCP algorithms and techniques that can be used by module 105*d* to reconstruct the region of interest are described in R. Chen et al., "Video Foreground Detection Algorithm Based on Fast Principal Component Pursuit and Motion Saliency," Comput. Intell. Neurosci. 2019, doi: 10.1155/2019/4769185, published 3 Feb. 2019, available at www.ncbi.nlm.nih.gov/pmc/articles/PMC6378080/, and E. Candés et al., "Robust Principal Component Analysis?," arXiv:0912.3599v1 [cs.IT] 18 Dec. 2009, available at arxiv.org/pdf/0912.3599.pdf, each of which is incorporated herein by reference.

After reconstruction of the region of interest from the selected frames, document authentication module 105*d* generates an authentication score (step 810) for the document using the reconstructed region of interest. In some embodiments, module 105*d* utilizes a keypoint matching approach to compare (step 810*a*) the reconstructed region of interest to a reference template. In other embodiments, module 105*d* uses a deep learning classification approach by executing (step 810*b*) a classification model using the reconstructed region of interest as input to generate a classification value for the document. Depending upon the approach used, module 105d generates an authentication score based upon either the results of the keypoint matching or the results of the deep learning classification. Each of these approaches is described in detail in the ADL section above, and are equally applicable to the PDL process. As such, these approaches are not repeated again here.

After document authentication module 105d has conducted the keypoint matching process and/or the deep learning classification process described above to generate the authentication score, module 105d determines (step 812) whether the physical document is authentic based upon the generated authentication score. For the keypoint matching approach, module 105d utilizes the authentication score generated from the comparison between the reconstructed region of interest and the reference template in order to make a determination of whether the document is authentic. As explained previously, in some embodiments module 105d can determine that a physical document is authentic or not authentic based upon a number and/or a percentage of keypoint matches between the reconstructed region of interest and the reference template. For the deep learning classification approach, module 105d can analyze one or more classification values returned by the deep learning classification model as authentication score(s) and analyze the score(s) (e.g., comparing the returned classification value to one or more threshold values) in order to determine whether the document is authentic—for example, when the model returns a classification value for the document that is at or above a certain threshold value, module 105d can determine that the document is authentic. When the classification value is below the threshold value, module 105d can determine that the document is not authentic. As can be appreciated, in some embodiments the classification value comprises at least one of a probability that the document is authentic, a confidence score that indicates whether the document is authentic, or a similarity metric that indicates whether the document is authentic. It should be appreciated that the above evaluations are merely exemplary and other methodologies for determining whether a document is authentic can be used within the scope of the technology described herein.

Furthermore, in some embodiments module 105d can utilize one or more interpretable methods to validate the classification value. In some embodiments, the one or more interpretable methods comprise occlusion of at least a portion of the document, perturbation of at least a portion of the document, or analysis of a heatmap of at least a portion of the document. Advantageously, module 105d can generate an output using the one or more interpretable methods described above that comprises an identification of the reconstructed region of interest that represents proof of the document being genuine or fraudulent. Exemplary interpretability techniques that can be adopted include, but are not limited to, one or more of: occlusion analysis, sensitivity analysis, class activation map (CAM), gradient-weighted class activation map (Grad-CAM) (as described in Selvaraju, supra), layer-wise relevance propagation (LRP) (as described in Montavon, supra), integrated gradient (as described in Sundararajan, supra) and PatternNetAttribution (as described in Kindermans, supra). A detailed overview of the interpretability of deep learning techniques is described in Lim, supra. There is not much debate about the interpretability of these CNN models: where did the networks look for discriminative characteristics when creating an authentication score? While classification accuracy is critical in automated authentication activities, understanding the reasoning behind the computer-assisted conclusion has become increasingly important and valued both in a governance context but also to investigate and ensure performance is in line with expectation. Adopting such techniques can aid in outlier detection, understanding and building confidence in a model's performance and rational for their behavior as well as building trust for developers, regulators and users of AI models. Further details regarding the visualization of image classification models are provided in Simonyan, supra, and Zeiler, supra. By using the methods for active and passive document liveness, the system is able to authenticate the presence and right behavior of the OVD elements in the document. Therefore, the output of these methods can prove the presence of genuine OVD elements or not in a document. This can be presented as a series of images where the characteristics and location of the OVD elements are explicitly extracted and presented as evidence (e.g., on a display device, for example, to a security agent or other authority tasked with confirming the authenticity of documents).

As mentioned above, in certain circumstances document authentication module 105d may be unable to make a determination of whether a given physical document is authentic or not. For example, portions of the physical document that comprise the region of interest may be partially occluded during video capture. When the region of interest is subsequently reconstructed by module 105d, the reconstructed region of interest may retain aspects of the occlusion that impact the keypoint matching process and/or the deep learning classification process. For example, in the keypoint matching process, module 105d may be able to identify a particular number of keypoint matches for unoccluded areas of the region of interest, but due to the occlusion, that number of keypoint matches does not meet the required threshold. For example, in the deep learning classification process, module 105d may not be able to generate sufficient features for the region of interest in order to execute the classification model and/or have the model return a classification value that is within an acceptable error value. In these situations, the user of mobile computing device 102 may ask for additional documentation and/or restart the authentication process described above.

When document authentication module 105d makes a determination of whether the physical document captured in the video is authentic or not authentic, module 105d can generate a corresponding notification for presentation to a user of mobile computing device 102. For example, mobile computing device 105d can be configured to generate a visual notification and/or audible notification—such as color-coded indicia displayed on a screen of mobile computing device 102 (e.g., green indicates authentic, red indicates not authentic, yellow indicates unable to determine), different audio tones emitted by mobile computing device 102 (e.g., a first tone indicates authentic, a second tone indicates not authentic, a third tone indicates unable to determine). In some embodiments, when mobile computing device 102 is unable to determine authenticity, device 102 can request that the user perform manual inspection of the document (e.g., using his or her judgment and experience to determine authenticity) and/or prompt the user to re-start the image capture and authentication process so that additional and/or improved images can be captured.

Figure 13A:
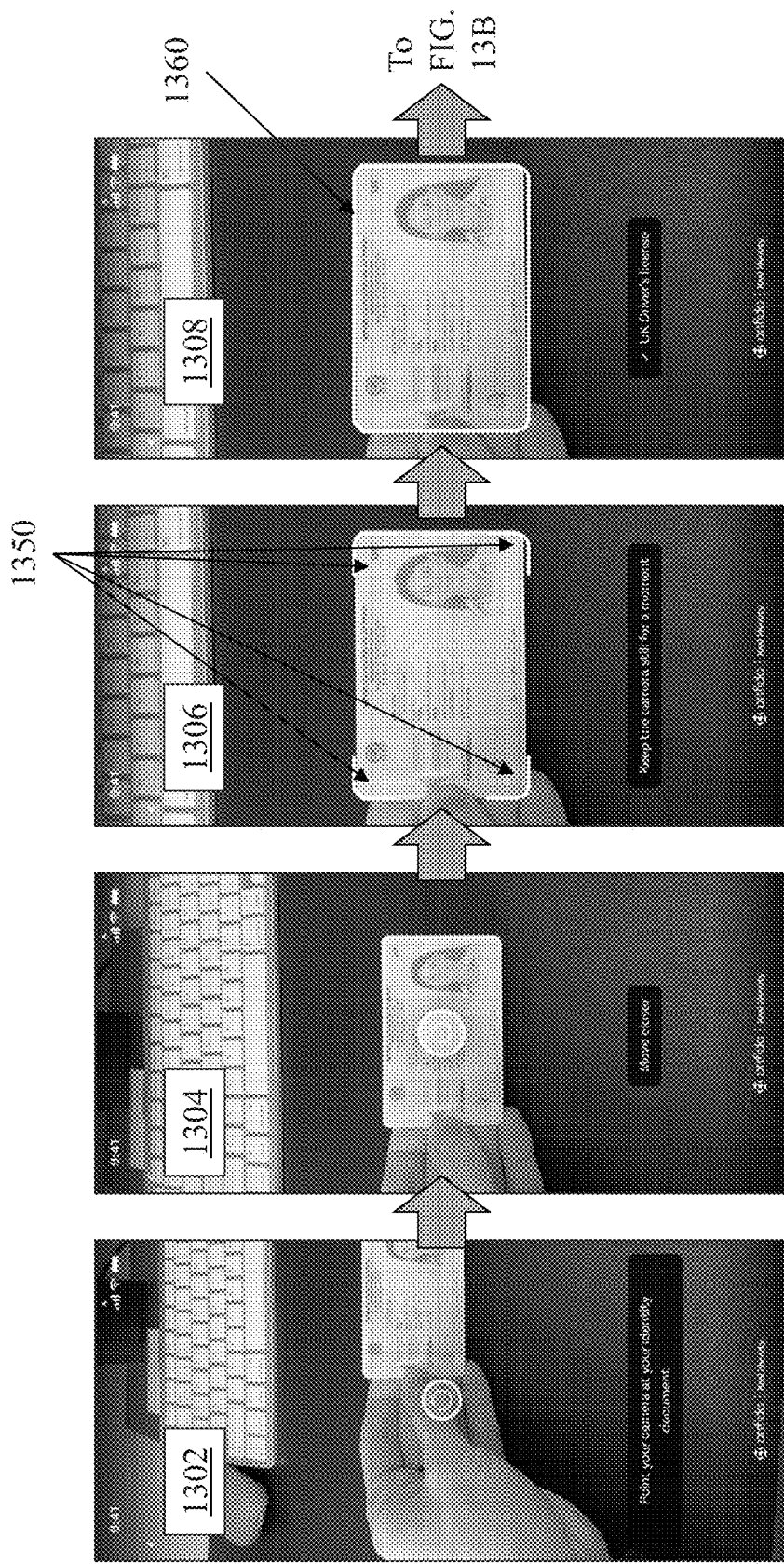
FIGS. 13A and 13B comprise an exemplary user interface workflow for guiding a user in capturing a document during a Passive Document Liveness process.
Figure 13B:

FIGS. 13A and 13B comprise an exemplary user interface workflow 1300 for guiding a user in capturing a document during a Passive Document Liveness process. As shown in FIG. 13A, a user of mobile computing device 102 can hold a document (e.g., a U.K. driver's license) in front of image capture device 103 (see screen 1302) and a user interface of device 102 (implemented by SDK 105) can guide the user to align the document with a user interface element (e.g., a circle) so that the document is fully visible and at a predetermined distance from the image capture device 103 (see screen 1304).

The user interface of mobile computing device 102 can then display another user interface element (e.g., bounding lines 1350 at the corners of the document and/or a bounding box 1360) in the user interface that confirms the document is properly positioned and aligned to the image capture device 103 (see screen 1306). The user interface instructs the user to hold the mobile computing device 102 (and/or the document) still for a moment and module 105d performs classification of the document to confirm the document is a U.K. driver's license (see screen 1308).

Turning to FIG. 13B, image capture device 103 and module 105d capture and process images of the document using varying capture settings. For example, module 105d can instruct image capture device 103 to capture one or more images of the document using a first set of capture settings, e.g., Auto mode (see screen 1310). Module 105d can then activate a lighting element of mobile computing device 103 (e.g., flash in Torch mode) to capture one or more additional images of the document (see screen 1312). Then, the user interface can display indicia to the user that the document is being scanned (see screen 1314) and that the document liveness check is complete, indicating the document is authenticated (see screen 1316).

As described above, the methods and systems described herein can utilize either or both of the ADL or PDL processes to authenticate a document by, e.g., analyzing and verifying one or more regions of interest in the document. Typically, the analysis and verification is performed to confirm that the correct regions of interest having the proper characteristics are present in the document at the right locations. In some embodiments, the methods and systems described herein can use these techniques as a negative authentication—meaning that the ADL and/or PDL processes can be used to validate that no other incorrect or suspicious regions of interest were inadvertently created by fraudsters. During or after the positive authentication process, system 100 may detect one or more additional regions of interest on a document that cannot be authenticated. For example, system 100 can determine that another OVD on a document was activated during image capture, in addition to one or more OVDs that are expected to be present. System 100 can determine that the additional OVD is not present on verified known authentic versions of the document and return an authentication score that indicates the document is not authentic, ask the user to capture more image(s) of the document and re-execute the authentication process, and/or refer the document authentication to a manual assessment process.

The above-described techniques can be implemented in digital and/or analog electronic circuitry, or in computer hardware, firmware, software, or in combinations of them. The implementation can be as a computer program product, i.e., a computer program tangibly embodied in a machine-readable storage device, for execution by, or to control the operation of, a data processing apparatus, e.g., a programmable processor, a computer, and/or multiple computers. A computer program can be written in any form of computer or programming language, including source code, compiled code, interpreted code and/or machine code, and the computer program can be deployed in any form, including as a stand-alone program or as a subroutine, element, or other unit suitable for use in a computing environment. A computer program can be deployed to be executed on one computer or on multiple computers at one or more sites.

Method steps can be performed by one or more processors executing a computer program to perform functions of the technology by operating on input data and/or generating output data. Method steps can also be performed by, and an apparatus can be implemented as, special purpose logic circuitry, e.g., a FPGA (field programmable gate array), a FPAA (field-programmable analog array), a CPLD (complex programmable logic device), a PSoC (Programmable System-on-Chip), ASIP (application-specific instruction-set processor), or an ASIC (application-specific integrated circuit), or the like. Subroutines can refer to portions of the stored computer program and/or the processor, and/or the special circuitry that implement one or more functions.

Processors suitable for the execution of a computer program include, by way of example, both general and special purpose microprocessors, and any one or more processors of any kind of digital or analog computer. Generally, a processor receives instructions and data from a read-only memory or a random access memory or both. The essential elements of a computer are a processor for executing instructions and one or more memory devices for storing instructions and/or data. Memory devices, such as a cache, can be used to temporarily store data. Memory devices can also be used for long-term data storage. Generally, a computer also includes, or is operatively coupled to receive data from or transfer data to, or both, one or more mass storage devices for storing data, e.g., magnetic, magneto-optical disks, or optical disks. A computer can also be operatively coupled to a communications network in order to receive instructions and/or data from the network and/or to transfer instructions and/or data to the network. Computer-readable storage mediums suitable for embodying computer program instructions and data include all forms of volatile and non-volatile memory, including by way of example semiconductor memory devices, e.g., DRAM, SRAM, EPROM, EEPROM, and flash memory devices; magnetic disks, e.g., internal hard disks or removable disks; magneto-optical disks; and optical disks, e.g., CD, DVD, HD-DVD, and Blu-ray disks. The processor and the memory can be supplemented by and/or incorporated in special purpose logic circuitry.

To provide for interaction with a user, the above described techniques can be implemented on a computer in communication with a display device, e.g., a CRT (cathode ray tube), plasma, or LCD (liquid crystal display) monitor, for displaying information to the user and a keyboard and a pointing device, e.g., a mouse, a trackball, a touchpad, or a motion sensor, by which the user can provide input to the computer (e.g., interact with a user interface element). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, and/or tactile input.

The above described techniques can be implemented in a distributed computing system that includes a back-end component. The back-end component can, for example, be a data server, a middleware component, and/or an application server. The above described techniques can be implemented in a distributed computing system that includes a front-end component. The front-end component can, for example, be a client computer having a graphical user interface, a Web browser through which a user can interact with an example implementation, and/or other graphical user interfaces for a transmitting device. The above described techniques can be implemented in a distributed computing system that includes any combination of such back-end, middleware, or front-end components.

The components of the computing system can be interconnected by transmission medium, which can include any form or medium of digital or analog data communication (e.g., a communication network). Transmission medium can include one or more packet-based networks and/or one or more circuit-based networks in any configuration. Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), Bluetooth, Wi-Fi, WiMAX, general packet radio service (GPRS) network, HiperLAN), and/or other packet-based networks. Circuit-based networks can include, for example, the public switched telephone network (PSTN), a legacy private branch exchange (PBX), a wireless network (e.g., RAN, code-division multiple access (CDMA) network, time division multiple access (TDMA) network, global system for mobile communications (GSM) network), and/or other circuit-based networks.

Information transfer over transmission medium can be based on one or more communication protocols. Communication protocols can include, for example, Ethernet protocol, Internet Protocol (IP), Voice over IP (VOIP), a Peer-to-Peer (P2P) protocol, Hypertext Transfer Protocol (HTTP), Session Initiation Protocol (SIP), H.323, Media Gateway Control Protocol (MGCP), Signaling System #7 (SS7), a Global System for Mobile Communications (GSM) protocol, a Push-to-Talk (PTT) protocol, a PTT over Cellular (POC) protocol, and/or other communication protocols.

Devices of the computing system can include, for example, a computer, a computer with a browser device, a telephone, an IP phone, a mobile device (e.g., cellular phone, smartphone, personal digital assistant (PDA) device, laptop computer, electronic mail device), and/or other communication devices. The browser device includes, for example, a computer (e.g., desktop computer, laptop computer) with a World Wide Web browser (e.g., Microsoft® Internet Explorer® available from Microsoft Corporation, Mozilla® Firefox available from Mozilla Corporation). Mobile computing devices include, for example, iOS™-based devices such as the iPhone™ and iPad™ available from Apple, Inc., and Android™-based devices such as the Galaxy™ available from Samsung Corp., the Pixel™ available from Google, Inc., and the Kindle Fire™ available from Amazon, Inc.

Comprise, include, and/or plural forms of each are open ended and include the listed parts and can include additional parts that are not listed. And/or is open ended and includes one or more of the listed parts and combinations of the listed parts.

One skilled in the art will realize the invention may be embodied in other specific forms without departing from the spirit or essential characteristics thereof. The foregoing embodiments are therefore to be considered in all respects illustrative rather than limiting of the invention described herein.

What is claimed is:

1. A system for authenticating a physical document, the system comprising a mobile computing device coupled to an image capture device, the mobile computing device configured to:

capture, using the image capture device, a sequence of images of a physical document in a scene as at least one of the physical document or the image capture device is rotated or tilted along one or more axes, during which the mobile computing device:
  tracks the physical document throughout the sequence of images by:
    dynamically determining a minimum range of motion for the physical document based upon one or more of the imaging conditions or the operational parameters of the image capture device;
    determining whether the rotation or tilt of the physical document or the image capture device satisfies the minimum range of motion; and
    instructing a user of the mobile computing device to continue rotating or tilting the physical document or the image capture device until the minimum range of motion is satisfied, and
  adjusts one or more operational parameters of the image capture device based upon one or more imaging conditions associated with the physical document, as detected in one or more images of the sequence of images;
select one or more images from the sequence of images and classify the physical document using the selected images;
identify a region of interest in the physical document using the selected images and the classification of the physical document;
reconstruct the region of interest using the selected images;
generate an authentication score for the physical document using the reconstructed region of interest; and
determine whether the physical document is authentic based upon the authentication score.

2. The system of claim 1, wherein the minimum range of motion comprises a rotation or tilt of at least a minimum number of degrees in each of one or more planes.

3. The system of claim 1, wherein the mobile computing device:
  dynamically adjusts one or more lighting parameters of the image capture device during capture of the sequence of images and assesses a signal associated with a region of interest in the physical document; and
  instructs the user of the mobile computing device to continue rotating or tilting the physical document or the image capture device until a minimum amount of signal associated with the region of interest is captured and the minimum range of motion is satisfied.

4. The system of claim 3, wherein the mobile computing device dynamically adjusts the one or more lighting parameters based upon one or more of: ambient lighting conditions, physical document characteristics, or amount of captured signal associated with the region of interest.

5. The system of claim 1, wherein tracking the physical document throughout the sequence of images comprises determining, for each image in the sequence of images, at least one of a location or a six-dimensional pose of the physical document in the image.

6. The system of claim 1, wherein the one or more imaging conditions comprise at least one or more of: lighting conditions, focus, or control attributes of the image capture device.

7. The system of claim 6, wherein the one or more operational parameters comprise at least one or more of: shutter speed, ISO speed, gain, aperture, flash intensity, flash duration, or light balance.

8. The system of claim 1, wherein selecting one or more images from the sequence of images comprises:
determining, for each image in the sequence of images, whether the image is usable or unusable for authentication; and
discarding the image when the image is determined as unusable.

9. The system of claim 8, wherein an image is determined to be unusable when: at least a portion of the physical document is occluded or missing, a viewing angle of the physical document exceeds a defined threshold, the image includes noise that exceeds a defined threshold, or at least a portion of the image is blurry.

10. The system of claim 1, wherein identifying a region of interest in the physical document using the selected images comprises:
for each image in the selected images:
detecting a location of the physical document in the image;
estimating a pose of the physical document in the image;
cropping a portion of the image based upon the detected location and the pose of the physical document;
estimating one or more characteristics of the physical document based upon the cropped portion of the image; and
aligning the cropped images based upon one or more of the estimated characteristics of the physical document in each cropped image.

11. The system of claim 10, wherein the mobile computing device identifies the region of interest in each of the aligned images based upon predefined coordinate values.

12. The system of claim 1, wherein the region of interest comprises an optical variable device (OVD).

13. The system of claim 1, wherein reconstructing the region of interest using the selected images comprises executing one or more of a robust principal component analysis (PCA) algorithm or a learned alternative mapping on the selected images to reconstruct the region of interest.

14. The system of claim 1, wherein the sequence of images of the physical document comprises a plurality of images of a front side of the physical document and a plurality of images of a back side of the physical document.

15. The system of claim 1, wherein generating an authentication score for the physical document using the reconstructed region of interest comprises executing one or more machine learning classification models using one or more features of the reconstructed region of interest as input to generate a classification value for the physical document.

16. The system of claim 15, wherein the one or more machine learning classification models comprise one or more of: deep learning models, Random Forest algorithms, Support Vector Machines, neural networks, or ensembles thereof.

17. The system of claim 15, wherein the classification value comprises at least one of a probability that the physical document is authentic, a confidence score that indicates whether the physical document is authentic, or a similarity metric that indicates whether the physical document is authentic.

18. The system of claim 15, wherein at least one of the one or more machine learning classification models is a convolutional neural network.

19. The system of claim 15, wherein the one or more machine learning classification models is an ensemble classifier comprised of a plurality of convolutional neural networks.

20. The system of claim 15, wherein one or more interpretable methods are used to validate the classification value.

21. The system of claim 15, wherein the one or more interpretable methods comprise occlusion of at least a portion of the physical document, perturbation of at least a portion of the physical document, or analysis of a heatmap of at least a portion of the physical document.

22. The system of claim 21, wherein an output of the one or more interpretable methods comprises an identification of the reconstructed region of interest that represents proof of the physical document being genuine or fraudulent.

23. The system of claim 15, wherein the one or more machine learning classification models are trained using a plurality of genuine documents, a plurality of fraudulent documents, or both.

24. The system of claim 23, wherein the classification value generated by the one or more machine learning classification models is a measure of similarity between one or more of the plurality of genuine documents, one or more of the plurality of fraudulent documents, or both.

25. The system of claim 1, wherein the mobile computing device preprocesses the sequence of images received from the image capture device prior to selecting the one or more images.

26. The system of claim 25, wherein preprocessing the sequence of images comprises one or more of: assessing video quality metrics for the entire sequence of images, detecting a location of the physical document in each image of the sequence of images, and determining one or more quality metrics for each image in the sequence of images.

27. The system of claim 26, wherein the video quality metrics comprise a length of the sequence of images, a frames-per-second (FPS) value associated with the sequence of images, and an image resolution associated with the sequence of images.

28. The system of claim 26, wherein the one or more quality metrics comprise (i) global image quality metrics including one or more of: glare, blur, white balance, or sensor noise characteristics, (ii) local image quality metrics including one or more of: blur, sharpness, text region confidence, character confidence, or edge detection, or (iii) both the global image quality metrics and the local image quality metrics.

29. The system of claim 28, wherein the sensor noise characteristics comprise one or more of: blooming, readout noise, or custom calibration variations.

30. A computerized method of authenticating a physical document, the method comprising:
capturing, using an image capture device coupled to a mobile computing device, a sequence of images of a physical document in a scene as at least one of the physical document or the image capture device is rotated or tilted along one or more axes, during which the mobile computing device:
tracks the physical document throughout the sequence of images by:
dynamically determining a minimum range of motion for the physical document based upon one or more of the imaging conditions or the operational parameters of the image capture device;

determining whether the rotation or tilt of the physical document or the image capture device satisfies the minimum range of motion; and
instructing a user of the mobile computing device to continue rotating or tilting the physical document or the image capture device until the minimum range of motion is satisfied, and
adjusts one or more operational parameters of the image capture device based upon one or more imaging conditions associated with the physical document, as detected in one or more images of the sequence of images;
selecting, by the mobile computing device, one or more images from the sequence of images and classifying the physical document using the selected images;
identifying, by the mobile computing device, a region of interest in the physical document using the selected images and the classification of the physical document;
reconstructing, by the mobile computing device, the region of interest using the selected images;
generating, by the mobile computing device, an authentication score for the physical document using the reconstructed region of interest; and
determining, by the mobile computing device, whether the physical document is authentic based upon the authentication score.

31. The method of claim 30, wherein the minimum range of motion comprises a rotation or tilt of at least a minimum number of degrees in each of one or more planes.

32. The method of claim 31, further comprising:
dynamically adjusting one or more lighting parameters of the image capture device during capture of the sequence of images and assesses a signal associated with a region of interest in the physical document; and
instructing the user of the mobile computing device to continue rotating or tilting the physical document or the image capture device until a minimum amount of signal associated with the region of interest is captured and the minimum range of motion is satisfied.

33. The method of claim 32, wherein the mobile computing device dynamically adjusts the one or more lighting parameters based upon one or more of: ambient lighting conditions, physical document characteristics, or amount of captured signal associated with the region of interest.

34. The method of claim 30, wherein tracking the physical document throughout the sequence of images comprises determining, for each image in the sequence of images, at least one of a location or a six-dimensional pose of the physical document in the image.

35. The method of claim 30, wherein the one or more imaging conditions comprise at least one or more of: lighting conditions, focus, or control attributes of the image capture device.

36. The method of claim 35, wherein the one or more operational parameters comprise at least one or more of: shutter speed, ISO speed, gain, aperture, flash intensity, flash duration, or light balance.

37. The method of claim 30, wherein selecting one or more images from the sequence of images comprises:
determining, for each image in the sequence of images, whether the image is usable or unusable for authentication; and
discarding the image when the image is determined as unusable.

38. The method of claim 37, wherein an image is determined to be unusable when: at least a portion of the physical document is occluded or missing, a viewing angle of the physical document exceeds a defined threshold, the image includes noise that exceeds a defined threshold, or at least a portion of the image is blurry.

39. The method of claim 30, wherein identifying a region of interest in the physical document using the selected images comprises:
for each image in the selected images:
detecting a location of the physical document in the image;
estimating a pose of the physical document in the image;
cropping a portion of the image based upon the detected location and the pose of the physical document;
estimating one or more characteristics of the physical document based upon the cropped portion of the image; and
aligning the cropped images based upon one or more of the estimated characteristics of the physical document in each cropped image.

40. The method of claim 39, wherein the mobile computing device identifies the region of interest in each of the aligned images based upon predefined coordinate values.

41. The method of claim 30, wherein the region of interest comprises an optical variable device (OVD).

42. The method of claim 30, wherein reconstructing the region of interest using the selected images comprises executing one or more of a robust principal component analysis (PCA) algorithm or a learned alternative mapping on the selected images to reconstruct the region of interest.

43. The method of claim 30, wherein the sequence of images of the physical document comprises a plurality of images of a front side of the physical document and a plurality of images of a back side of the physical document.

44. The method of claim 30, wherein generating an authentication score for the physical document using the reconstructed region of interest comprises executing one or more machine learning classification models using one or more features of the reconstructed region of interest as input to generate a classification value for the physical document.

45. The method of claim 44, wherein the one or more machine learning classification models comprise one or more of: deep learning models, Random Forest algorithms, Support Vector Machines, neural networks, or ensembles thereof.

46. The method of claim 44, wherein the classification value comprises at least one of a probability that the physical document is authentic, a confidence score that indicates whether the physical document is authentic, or a similarity metric that indicates whether the physical document is authentic.

47. The method of claim 44, wherein at least one of the one or more machine learning classification models is a convolutional neural network.

48. The method of claim 44, wherein the one or more machine learning classification models is an ensemble classifier comprised of a plurality of convolutional neural networks.

49. The method of claim 44, wherein one or more interpretable methods are used to validate the classification value.

50. The method of claim 49, wherein the one or more interpretable methods comprise occlusion of at least a portion of the physical document, perturbation of at least a portion of the physical document, or analysis of a heatmap of at least a portion of the physical document.

51. The method of claim 50, wherein an output of the one or more interpretable methods comprises an identification of the reconstructed region of interest that represents proof of the physical document being genuine or fraudulent.

52. The method of claim 44, wherein the one or more machine learning classification models are trained using a plurality of genuine documents, a plurality of fraudulent documents, or both.

53. The method of claim 52, wherein the classification value generated by the one or more machine learning classification models is a measure of similarity between one or more of the plurality of genuine documents, one or more of the plurality of fraudulent documents, or both.

54. The method of claim 30, wherein the mobile computing device preprocesses the sequence of images received from the image capture device prior to selecting the one or more images.

55. The method of claim 54, wherein preprocessing the sequence of images comprises one or more of: assessing video quality metrics for the entire sequence of images, detecting a location of the physical document in each image of the sequence of images, and determining one or more quality metrics for each image in the sequence of images.

56. The method of claim 55, wherein the video quality metrics comprise a length of the sequence of images, a frames-per-second (FPS) value associated with the sequence of images, and an image resolution associated with the sequence of images.

57. The method of claim 56, wherein the one or more quality metrics comprise (i) global image quality metrics including one or more of: glare, blur, white balance, or sensor noise characteristics, (ii) local image quality metrics including one or more of: blur, sharpness, text region confidence, character confidence, or edge detection, or (iii) both the global image quality metrics and the local image quality metrics.

58. The method of claim 57, wherein the sensor noise characteristics comprise one or more of: blooming, readout noise, or custom calibration variations.

59. A system for authenticating a physical document, the system comprising a mobile computing device coupled to an image capture device, the mobile computing device configured to:
capture, using the image capture device, a sequence of images of a physical document in a scene as at least one of the physical document or the image capture device is rotated, during which the mobile computing device:
tracks the physical document throughout the sequence of images, and
adjusts one or more operational parameters of the image capture device based upon one or more imaging conditions associated with the physical document, as detected in one or more images of the sequence of images;
preprocess the sequence of images received from the image capture device by performing one or more of: assessing video quality metrics for the entire sequence of images, detecting a location of the physical document in each image of the sequence of images, and determining one or more quality metrics for each image in the sequence of images, wherein the video quality metrics comprise a length of the sequence of images, a frames-per-second (FPS) value associated with the sequence of images, and an image resolution associated with the sequence of images;
select one or more images from the sequence of images and classify the physical document using the selected images;
identify a region of interest in the physical document using the selected images and the classification of the physical document;
reconstruct the region of interest using the selected images;
generate an authentication score for the physical document using the reconstructed region of interest; and
determine whether the physical document is authentic based upon the authentication score.

* * * * *